US012688280B2

(12) United States Patent
Melin et al.

(10) Patent No.: US 12,688,280 B2
(45) Date of Patent: Jul. 21, 2026

(54) GOVERNANCE AND DATA PROTECTION IN USE OF GENERATIVE ARTIFICIAL INTELLIGENCE

(71) Applicant: NROC Security Oy, Helsinki (FI)

(72) Inventors: Markus Melin, Espoo (FI); Antti Reijonen, Larchmont, NY (US)

(73) Assignee: NROC Security Oy, Helsinki (FI)

( * ) Notice: Subject to any disclaimer, the term of this patent is extended or adjusted under 35 U.S.C. 154(b) by 6 days.

(21) Appl. No.: 18/794,488

(22) Filed: Aug. 5, 2024

(65) Prior Publication Data

US 2026/0037617 A1 Feb. 5, 2026

(51) Int. Cl.
*G06F 21/54* (2013.01)
*G06N 3/0475* (2023.01)

(52) U.S. Cl.
CPC ........... *G06F 21/54* (2013.01); *G06N 3/0475* (2023.01)

(58) Field of Classification Search
None
See application file for complete search history.

(56) References Cited

U.S. PATENT DOCUMENTS

| | | | | |
|---|---|---|---|---|
| 10,191,908 | B1 * | 1/2019 | Dodke .................. | G06F 21/556 |
| 11,544,292 | B1 * | 1/2023 | Timilsina ........... | G06Q 10/1093 |
| 12,273,392 | B1 * | 4/2025 | Yang ........................ | H04L 63/20 |
| 12,293,060 | B1 * | 5/2025 | Dwivedi .............. | G06F 3/0482 |
| 12,321,725 | B1 * | 6/2025 | Wilson ...................... | G06F 8/36 |
| 12,406,207 | B2 * | 9/2025 | Turley ................... | G06N 5/022 |
| 12,423,519 | B1 * | 9/2025 | Sharma ................... | G06N 3/08 |
| 12,437,058 | B1 * | 10/2025 | Majmudar .............. | G06F 21/54 |
| 12,464,027 | B2 * | 11/2025 | Arkoff .................... | H04L 63/20 |
| 12,495,078 | B1 * | 12/2025 | Mritunjai .............. | H04L 63/205 |
| 12,536,375 | B2 * | 1/2026 | Martinez .............. | G06F 40/295 |
| 2004/0193703 | A1 * | 9/2004 | Loewy ............... | H04L 41/0894 709/220 |
| 2006/0190480 | A1 * | 8/2006 | Ori ........................ | G06Q 10/06 |
| 2013/0110748 | A1 * | 5/2013 | Talati ............... | G06F 16/90344 707/758 |
| 2018/0113938 | A1 * | 4/2018 | Piramuthu .......... | G06F 16/2237 |
| 2018/0225280 | A1 * | 8/2018 | Dugan ................... | G06N 20/20 |
| 2019/0042488 | A1 * | 2/2019 | Guim Bernat .......... | G06F 9/505 |
| 2021/0029089 | A1 * | 1/2021 | Lewin ................. | H04L 63/1408 |

(Continued)

OTHER PUBLICATIONS

Vikram, et al. "Artificial Intelligence-Based Data Leakage Prevention System for Organizations and Individuals Using Block Chain and Machine Learning Algorithms", Indian Application No. 202441005521, filing date Jan. 27, 2024, publication date Feb. 9, 2024 (10 pages).

*Primary Examiner* — Michael W Chao
(74) *Attorney, Agent, or Firm* — Robert P. Michal, Esq.; Rimon PC

(57) ABSTRACT

A method for governing a generative artificial intelligence (Gen AI) application interaction. Input destined to a Gen AI application via a user interface is received and temporarily stored in a proxy. A policy screening is applied on the input for categorizing the input into one of 'allow', 'ask' and 'block' categories. At least one policy enforcement action is performed depending on the categorization of the input, the policy enforcement action resulting either releasing the input from the proxy to the Gen AI application or blocking the input from being forwarded to the Gen AI application. All interaction with Gen AI is logged.

17 Claims, 8 Drawing Sheets

(56)                    References Cited

U.S. PATENT DOCUMENTS

| | | | |
|---|---|---|---|
| 2021/0174089 A1* | 6/2021 | Rao | G06V 30/274 |
| 2022/0150280 A1* | 5/2022 | Azulay | H04L 63/0428 |
| 2024/0169195 A1* | 5/2024 | Tao | G06N 3/08 |
| 2024/0267344 A1* | 8/2024 | Mulligan | H04L 51/212 |
| 2024/0394249 A1* | 11/2024 | Cunningham | G06F 16/248 |
| 2024/0394404 A1* | 11/2024 | O'Neal | G06F 21/6245 |
| 2024/0412031 A1* | 12/2024 | Rayman | G06N 20/00 |
| 2024/0430233 A1* | 12/2024 | Tanner | H04L 63/0245 |
| 2025/0028745 A1* | 1/2025 | Chen | G06F 16/338 |
| 2025/0046305 A1* | 2/2025 | Goldshtein | G10L 15/22 |
| 2025/0094619 A1* | 3/2025 | Pasumarthi | G06F 40/295 |
| 2025/0103858 A1* | 3/2025 | Chen | G06N 3/0455 |
| 2025/0131121 A1* | 4/2025 | Teng | G10L 15/30 |
| 2025/0147832 A1* | 5/2025 | Agrawal | G06F 11/0787 |
| 2025/0175497 A1* | 5/2025 | Salem | H04L 63/1466 |
| 2025/0190801 A1* | 6/2025 | Lucas | G06N 3/0895 |
| 2025/0292018 A1* | 9/2025 | Yannuzzi | G06F 40/279 |
| 2025/0307418 A1* | 10/2025 | Spencer | G06F 21/577 |
| 2025/0307640 A1* | 10/2025 | Belgi | G06N 3/0895 |
| 2025/0337758 A1* | 10/2025 | Hu | G06N 3/08 |
| 2026/0023842 A1* | 1/2026 | Neystadt | G06F 21/45 |

* cited by examiner

GOVERNANCE AND DATA PROTECTION IN USE OF GENERATIVE ARTIFICIAL INTELLIGENCE

FIELD OF THE DISCLOSURE

The present disclosure relates to the technical field of computer application security, and particularly to a computer-implemented method and application for governance and data protection associated with use of generative artificial intelligence. The present disclosure further concerns a computer program product that implements governance and data protection.

BACKGROUND OF THE DISCLOSURE

Generative artificial intelligence (Gen AI) refers to artificial intelligence capable of generating text, images, video and other types of digital information using generative models. A typical Gen AI application is provided with a user interface, making AI-generated content in response to one or more input prompts given by a human user. Gen AI is an advanced kind of artificial intelligence. Gen AI models learn patterns and structure of input training data and then generate new data that has similar characteristics. Gen AI can simulate human learning by employing neural networks that mimic the intricate functioning of the human brain.

Recent improvements in Gen AI, in particular large language models, have enabled an increase in available Gen AI applications. Gen AI is applied in various fields, including but not limited to software development, healthcare, finance, entertainment, customer service, sales and marketing, art, writing, fashion, and product design. Gen AI applications can generate for example text, computer program code, images, audio, music, video, molecules and/or data.

Data loss prevention, commonly known as DLP, is a commonly applied process of identifying sensitive data and offering options for its removal before any unauthorized disclosure occurs. Personally Identifiable Information (PII), confidential passwords and secrets, Protected Health Information (PHI), and commercially sensitive data are examples of sensitive data that may be removed by a DLP system. DLP software is computer software that is configured to detect potential data breaches and/or data exfiltration transmissions and to prevent them by monitoring, detecting, and blocking sensitive data while in use, in motion and at rest. In this context, 'in use' refers to endpoint actions, typically by a human user, 'in motion' refers to network traffic and 'at rest' refers to data storage.

With the increasing adoption of generative artificial intelligence in professional settings, tailored governance and data protection solutions are needed in enterprises that is easy to deploy, minimizes user inconvenience, and enhances sensitive data safeguarding while preserving the user experience of Gen AI applications. Gen AI applications have different privacy and security levels. Public Gen AI applications may use any information fed into the system for further teaching the Gen AI, but also proprietary Gen AI applications are available, which can be trained by an organisation with its proprietary data, while such proprietary data-trained Gen AI can only be utilized within the organization.

Organizations may have policies about who in the organization is allowed to use which application, what is allowed data to be used, and what are allowed and undesired Gen AI use cases. Organizations may consequently have created acceptable use policies for Gen AI, provided training to the business users and maybe taken a few Gen AI applications into use. However, there are short term concerns that hold organizations back from a broader Gen AI application rollout. There is lack of visibility to the actual usage of Gen AI applications and therefore inability to prove to internal and external stakeholders that policies are being followed. Further, there is lack of technical controls to prevent unauthorized use, stop personally identifiable or other sensitive information from being submitted to the Gen AI applications or block undesired AI generated responses from being obtained.

There is a need for technical safeguards against violations of acceptable Gen AI use-policies, and a need for metrics, logs and other telemetry data to be collected as evidence that the said policies are being enforced.

Document IN202441005521A discloses a data loss prevention solution using block chain and machine learning for preventing leakage of sensitive data with generative artificial intelligence.

BRIEF DESCRIPTION OF THE DISCLOSURE

An object of the present disclosure is to provide a computer implemented method so as to solve the above problems.

The object of the disclosure is achieved by a computer implemented method, and by a computer program product, which are characterized by what is stated in the independent claims. Some embodiments of the disclosure are disclosed in the dependent claims.

The disclosure is based on the idea of providing a governance and data protection mechanism that provides an enhanced user interface that seamlessly integrates with the Gen AI application and its user interface, preserving user experience of the Gen AI application while applying screening policies to safeguard sensitive data from being submitted to public and governing use of Gen AI application generated content. The disclosed governance and data protection mechanism is preferably provided as a computer application. Terms governance and data protection mechanism and governance and data protection application may thus be used interchangeably.

The governance and data protection mechanism collects log data on all interactions with all Gen AI applications used in an organization, enabling tracking and analysing use of Gen AI applications within the organization, as well as providing evidence of policy enforcement. Collected knowledge of use cases of Gen AI applications by members of the organization enables further improvement of Gen AI application policies that facilitate enhanced utilization of Gen AI applications. Each prompt, grounding and data feed, and response are screened by one or more policies, and based on the screening, a policy enforcement action is selected from three category alternatives: 'allow', 'block' and 'ask'.

According to a first aspect, a method for governing a Gen AI interaction is provided. The method comprises receiving input destined to a generative artificial intelligence (Gen AI) application via a user interface, temporarily storing the input in a proxy, and applying a policy screening on the input. The policy screening comprises categorizing the input into one of 'allow', 'ask' and 'block' categories, and performing at least one policy enforcement action depending on the categorization of the input. The at least one policy enforcement action is selected among:

a) an 'allow' policy enforcement action causing passing
        the input from the proxy to the Gen AI application, if the input is categorized into 'allow' category by all of the plurality of applied screening policies, b) a 'block' policy enforcement action, causing the policy screening to stop processing of the input, not submitting the input to the Gen AI application, and the user interface displaying the user a reason for blocking the input, wherein the displayed reason refers to a respective screening policy that caused the input to be categorized into the 'block' category, c) an 'ask' policy enforcement action, causing the user interface to i) provide the user with information or a link to information that describes a respective screening policy causing the input or at least one piece of data comprised in the input to cause the input to be categorized into the 'ask' category, ii) provide the user a prompt to submit a screening policy prompted input comprising a rationale, iii) upon receiving, via the user interface, the screening policy prompted input, logging the screening policy prompted input, iv) receiving, from the user, any one of an indication to continue with the Gen AI application interaction and an indication to cancel the Gen AI application interaction, and v) in dependence of the indication received from the user, performing the respective policy enforcement action a) or b).

According to some embodiments, the method comprises categorizing the input into one of 'allow', 'ask' and 'block' categories based on a plurality of screening policies. Said plurality of screening policies determine said 'allow', 'ask' and 'block' categories based on at least two of: one or more data types, wherein the one or more data types is selected from a list comprising: text, image, video, computer program code, other, personally identifiable information and/or secrets, one or more content categories, wherein the content category of input is selected from a list comprising at least two of: computer program code, text with legal content, text with financial content, text with political content, text with medical content and other, optionally a custom keyword list, wherein the optional custom keyword list determines one or more keywords and/or one or more phrases and/or a vector and/or one or more partial words with a wildcard, optionally one or more data rate limits, wherein data rate limit refers to a limit of size of binary data to be submitted as input.

According to some embodiments, the content category of the input is determined by means of artificial intelligence trained with general use training data representing one or more predetermined content categories and/or organization-specific training data representing one or more organization-specific content categories and/or one or more organization-specific content sub-categories.

According to some embodiments, if step a) was performed, the method further comprises vi) receiving Gen AI generated content from the Gen AI application in response to the input passed to the Gen AI application, vii) temporarily storing the Gen AI generated content in a proxy, viii) applying a policy screening on the Gen AI generated content, wherein the policy screening comprises categorizing the Gen AI generated content into one of 'allow', 'ask' and 'block' categories based on a plurality of screening policies, and performing at least one policy enforcement action depending on the categorization of the Gen AI generated content. The at least one policy enforcement action is selected among:

d) 'allow' policy enforcement action causing passing the Gen AI generated content from the proxy as result to the user interface, if the Gen AI generated content is categorized into 'allow' category by all applied screening policies, e) 'block' policy enforcement action causing the policy screening to disable the Gen AI generated content from being passed from the proxy to the user interface, and causing the user interface to display the user with a reason for blocking the Gen AI generated content, wherein the displayed reason refers to a respective screening policy that caused the Gen AI generated content to be categorized into the 'block' category, f) 'ask' policy enforcement action causing the user interface: to provide the user with information or a link to information that determines a respective screening policy causing the Gen AI generated content to be categorized into the 'ask' category, to provide the user a prompt to submit a screening policy prompted input comprising a rationale why the Gen AI generated content should be categorized into the 'allow' category, upon receiving, via the user interface, the screening policy prompted input comprising the rationale, storing the screening policy prompted input in a log, receiving, from the user, any one of an indication to continue with the Gen AI application interaction and an indication to cancel the Gen AI application interaction, and in dependence of the indication received from the user, performing the respective policy enforcement action d) or e).

According to some embodiments, the method comprises categorizing the Gen AI generated content into one of 'allow', 'ask' and 'block' categories based on an anti-drift policy, which causes the Gen AI generated content to be categorized into the respective category based on: one or more data types, wherein the one or more data types is selected from a list comprising: image, video, computer program code, other, and one or more content categories, wherein the content category of Gen AI generated content is selected from a list comprising two or more of: computer program code, text with legal content, text with financial content, text with political content, text with medical content, and other.

According to some embodiments, the content category of the Gen AI generated content is determined by means of artificial intelligence trained with general use training data representing predetermined content categories and/or organization-specific labelled training data representing one or more organization-specific content categories and/or one or more organization-specific content sub-categories.

According to some embodiments, training data for training artificial intelligence used for determining one or more organization-specific content categories and/or organization-specific content sub-categories comprises previously categorized input and/or Gen AI generated content. Each previously categorized input and/or Gen AI generated content included in the training data is organization-specific labelled training data. The organization-specific labelling indicates the organization-specific content category or the organization-specific content sub-category of each piece of training data.

According to some embodiments, the method comprises updating a word vector database based on said organization-specific labelled training data. The word vector database is used by artificial intelligence for determining one or more organization-specific content categories and/or organization-specific content sub-categories.

According to some embodiments, the training data is discarded after completing updating of the word vector database.

According to some embodiments, the method further comprises modifying result by embedding a unique identifier therein and storing the result in a log with the unique identifier.

According to some embodiments, the unique identifier is embedded into the result as any one of a text addition, file metadata addition, an embedded watermark or other non-removable technical encoding.

According to some embodiments, the method comprises logging of each governed Gen AI interaction, wherein the logging comprises storing log data of the Gen AI interaction event. The log data comprises interaction payload information comprising a unique reference assigned to the Gen AI interaction, input prompt submitted by the user, input payload submitted by the user, if submitted by the user, and Gen AI generated content, if received in response to the input, and policy event information comprising at least one time stamp for the Gen AI interaction, screening policy or policies applied to the Gen AI interaction, performed policy enforcement action, screening policy prompted input, if any, and optional success and/or failure codes concerning the policy event.

According to a second aspect, a computer executable code stored on a non-transitory computer readable medium is provided. The computer executable code has instructions which, when executed by a computing device or system cause the computing device or system to perform a method comprising receiving input destined to a Gen AI application via a user interface, temporarily storing the input in a proxy, applying a policy screening on the input, wherein the policy screening comprises categorizing the input into one of 'allow', 'ask' and 'block' categories, and performing at least one policy enforcement action depending on the categorization of the input. The at least one policy enforcement action is selected among: a) an 'allow' policy enforcement action causing passing the input from the proxy to the Gen AI application, if the input is categorized into 'allow' category by all of the plurality of applied screening policies, b) a 'block' policy enforcement action, causing the policy screening to stop processing of the input, not submitting the input to the Gen AI application, and the user interface displaying the user a reason for blocking the input, wherein the displayed reason refers to a respective screening policy that caused the input to be categorized into the 'block' category, and c) an 'ask' policy enforcement action, causing the user interface to i) provide the user with information or a link to information that describes a respective screening policy causing the input or at least one piece of data comprised in the input to cause the input to be categorized into the 'ask' category, ii) provide the user a prompt to submit a screening policy prompted input comprising a rationale, iii) upon receiving, via the user interface, the screening policy prompted input, logging the screening policy prompted input, iv) receiving, from the user, any one of an indication to continue with the Gen AI application interaction and an indication to cancel the Gen AI application interaction, and v) in dependence of the indication received from the user, performing the respective policy enforcement action a) or b).

According to a third aspect, a computing device or system comprising memory that includes computer executable code that performs, when executed with one or more processors of the computing device or system, a method comprising receiving input destined to a Gen AI application via a user interface, temporarily storing the input in a proxy, applying a policy screening on the input, wherein the policy screening comprises categorizing the input into one of 'allow', 'ask' and 'block' categories, and performing at least one policy enforcement action depending on the categorization of the input. The at least one policy enforcement action is selected among: a) an 'allow' policy enforcement action causing passing the input from the proxy to the Gen AI application, if the input is categorized into 'allow' category by all of the plurality of applied screening policies, b) a 'block' policy enforcement action, causing the policy screening to stop processing of the input, not submitting the input to the Gen AI application, and the user interface displaying the user a reason for blocking the input, wherein the displayed reason refers to a respective screening policy that caused the input to be categorized into the 'block' category, and c) an 'ask' policy enforcement action, causing the user interface to i) provide the user with information or a link to information that describes a respective screening policy causing the input or at least one piece of data comprised in the input to cause the input to be categorized into the 'ask' category, ii) provide the user a prompt to submit a screening policy prompted input comprising a rationale, iii) upon receiving, via the user interface, the screening policy prompted input, logging the screening policy prompted input, iv) receiving, from the user, any one of an indication to continue with the Gen AI application interaction and an indication to cancel the Gen AI application interaction, and v) in dependence of the indication received from the user, performing the respective policy enforcement action a) or b).

An advantage of the disclosed governance and data protection mechanism provides four main security capabilities. 1) It controls what applications can be used by which user groups. 2) It prevents loss of sensitive data, 3) It keeps usage of Gen AI applications within the organization within acceptable guardrails and 4) tracking, tagging and/or watermarking Gen AI generated content enable tracing of Gen AI created artefacts back to the application, input prompt, input payload content, time and user responsible of creation.

On top of the 4 security capabilities, the governance and data protection mechanism also produces evidence that users in the organization follow the organization's acceptable use policies for Gen AI.

According to some embodiments, Large Language Model (LLM) security posture management is made available as part of the governance and data protection mechanism according to the disclosure, for providing configuration assistance to various applications containing Gen AI user experiences. According to some embodiments, the governance and data protection mechanism prevents prompt injection, jailbreaking and other malicious user interaction patterns. The governance and data protection mechanism also ensures regulatory compliance: it enables reviewing compliance to set policies, producing evidence of said compliance, and all usage of Gen AI applications can be observed against a set of regulatory and compliance frameworks. In this context, prompt injection refers to a process of affecting LLM output by complementing the original with additional unauthorized input. In this context, jailbreaking refers to bypassing the LLMs built-in safeguards against unacceptable outputs or training data extraction. As cyberattacks become more sophisticated, developers are deploying security tools with advanced capabilities to thwart jailbreaking attempts.

The solution provides real-time guidance to users. When it is determined that an input or Gen AI generated content triggers and 'ask' policy enforcement action, an 'are you sure question' is presented to the user in the user interface together with a link to further, preferably company-specific, guidance concerning the policy relevant to the user's input or the Gen AI generated content.

The solution enforces an anti-drift policy, which refers to determining acceptable uses of Gen AI applications. For example, the anti-drift policy prevents business users from becoming "amateur attorneys" or "amateur coders" with the help of a general-purpose Gen AI application such as ChatGPT.

The solution applies artificial intelligence in the data security policy enforcement. The scanning and categorization mechanisms, such as PII and secrets scanners, custom keyword lists and automated 2-way categorization create a policy construct that is effective without reliance on pre-defined data classification and data labelling. Artificial intelligence is applied for identifying data categories and labelling input on the fly, based on a proprietary ML model that is trained to categorize text into pre-defined categories that are trained to the model one by one.

The governance and data security solution further provides a dashboard that enables AI champions and/or administrators within the organization to drive adoption of Gen AI applications. The dashboard shows progress in the Gen AI adoption mission as well as measures of coverage of the established safeguards and measures the friction the security introduces to the organization.

BRIEF DESCRIPTION OF THE DRAWINGS

In the following the disclosure will be described in greater detail by means of preferred embodiments with reference to the accompanying drawings, in which.

Figures 1, 2:
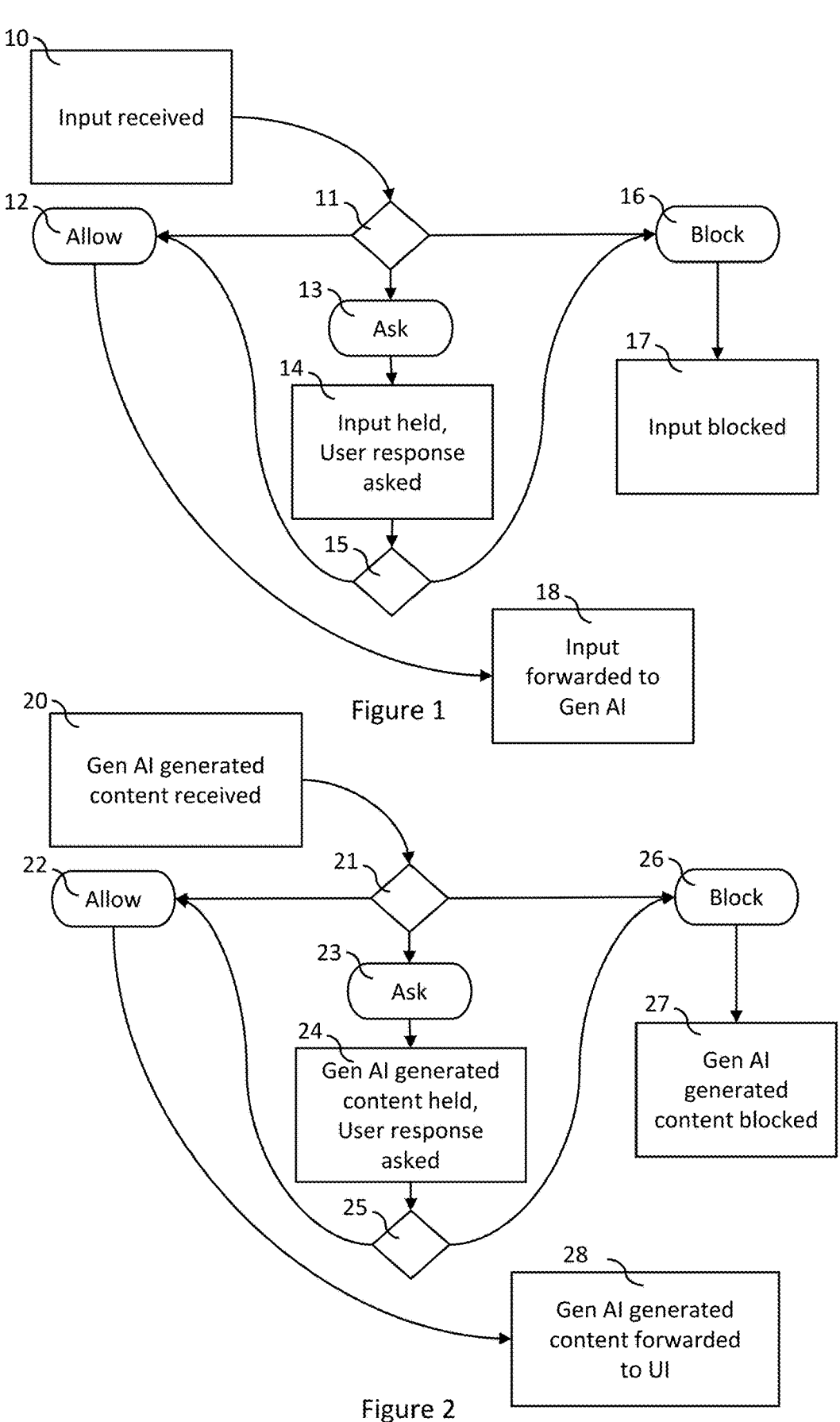
FIG. 1 illustrates a method for screening input.
FIG. 2 illustrates a method for screening Gen AI generated content.

The figures are for illustrative purposes only, representing a non-limiting example of possible implementation.

DETAILED DESCRIPTION OF THE DISCLOSURE

The disclosure relates to governance and data protection in use of generative artificial intelligence. In particular, the disclosure relates to a computer-implemented governance and data protection mechanism, and to a computer program product implementing such mechanism.

In this context, term 'input' refers to input provided for prompting a Gen AI application to perform a task. Input may comprise a user-written prompt, referred herein as input prompt, in a Gen AI chat user interface, and/or it may comprise various types of data provided by the user in association with the user's request, referred herein as input payload.

In this context, the term 'Gen AI generated content' refers to content generated and provided by a Gen AI application upon receiving input, before it is provided to the user.

In this context, the term 'result' refers to Gen AI generated content that is provided to the user by a Gen AI application that has been screened by the governance and data protection mechanism according to the disclosure. Thus, not all Gen AI generated content is provided as result, but some Gen AI generated content may be blocked from being provided to the user if the Gen AI generated content does not comply with applied anti-drift policy.

In this context, the term 'policy screening', also referred to in short as 'screening', refers to a process of screening input and Gen AI generated content by the governance and data protection mechanism according to at least one policy. Policy screening determines whether the input and Gen AI generated content complies with the relevant, applied governance conditions, and determines whether the respective input can be forwarded to the Gen AI application and whether the respective Gen AI generated content is provided to the user as a result.

User interface for implementing policy screening of input to Gen AI application and Gen AI generated content may be implemented as a man in the middle-type implementation performed by the governance and data protection mechanism.

In this context, an 'overlay modal' refers to output provided for the user in the user interface, typically shown on a display of a user interface, that informs the user about a screening policy decision made by the governance and data protection mechanism, and preferably at least one reason behind the respective decision. The overlay modal may further comprise a link to information that further explains the applied policy that caused the policy screening decision that caused the overlay modal to be displayed. The overlay modal may further prompt the user to provide an answer to a question presented on the overlay modal. A response to such additional questions is referred herein as 'screening policy prompted input'.

In this description, terms 'organization', 'customer organization' and 'customer' are used interchangeably. All terms refer to an organization that uses the governance and data protection mechanism for protecting its proprietary data according to security policies of the organization.

FIG. 1 illustrates method steps of policy screening input when a user provides input for prompting a Gen AI application to generate desired Gen AI generated content. The user interface towards the Gen AI application preferably appears to the user like a Gen AI application's normal user interface, but with additional functionality. For example, the user interface may appear like a standard ChatGPT, Microsoft Copilot Bing or Google Gemini chat user interface with additional policy screening functionalities. According to a preferred embodiment, policy screening is implemented as a network proxy. In a browser-based Gen AI application user interface, the policy screening can be implemented as a browser extension.

In a typical use case, the user uses the user interface for prompting the Gen AI application to create some type of Gen AI generated content by providing input thereto. The input may comprise a written question or request in natural language, but the input may also comprise other types of data, such as a data file, text copied from a data file, one or more images, videos, to name a few.

The received input is temporarily held in a proxy of the governance and data protection mechanism and subjected to a policy screening the input according to a plurality of different screening policies preferably based on both data type and content categorization. Policy screening is preferably performed as a plurality of atomic screening processes like the one illustrated in the FIG. 1, each considering just one of the screening policies. Final policy enforcement action is made in combination of results of policy screening performed according to all determined screening policies.

Before the input can be forwarded to the Gen AI application, it is received 10 by the governance and data protection mechanism, which performs data categorization 11 to all input submitted by the user, whether it was any type of data and/or a simple written prompt. The data categorization 11 is performed with respect to a plurality of different screening policies determined in the governance and data protection mechanism. Policy screening over different policies may be performed one by one, and/or as consecutive steps.

The received input is temporarily held in a proxy of the governance and data protection mechanism and subjected to the data categorization 11 and the policy screening of the input. As a result of each individual screening policy, the input can be determined as comprising solely allowable information according to the respective screening policy, thus falling into an 'allow' content category, referred in short as an 'allow' 12 alternative. When the input is categorized into the 'allow' category, it causes selection of an 'allow' policy screening action based on the respective screening policy.

If the input comprises forbidden or sensitive information, infringing the respective screening policy, the input is categorized into a 'block' category, referred in short as a 'block' 16 alternative. This triggers a 'block' policy screening action, which should always lead to a 'block' content enforcement action. The 'block' policy enforcement action means that the input is not allowed to be forwarded from the proxy to the Gen AI application, and the user interface outputs 17 a notification to the user, indicating that the input was determined to comprise blocked information, which must not and was not forwarded to the Gen AI application. Preferably, the notification presented for the user further determines, what was the reason for blocking the request and which part of the request caused this blocking. According to some embodiments, the 'block' notification is provided as an overlay modal, which appears on the user interface. A 'block' policy enforcement action is performed always if one or more screening policies result in determining that input falls in 'block' category, thus triggering a 'block' policy screening action.

A third alternative for policy screening is that it determines that the input falls into 'ask' category under the respective screening policy and thus triggers an 'ask' policy screening action. In such a case, the user interface indicates to the user that it is suspected that the input may comprise data that is against a screening policy. This alternative is indicated in the FIG. 1 by the 'ask' 13 alternative. According to some embodiments, the 'ask' notification is provided as the overlay modal, which appears on the user interface. In case of the input being categorized into the 'ask' 13 category, the overlay modal presents the user a prompt to provide further information before a final policy decision can be made. In response, the user is expected to give his/her screening policy prompted input.

If the input falls in the 'ask' category, thus triggering the 'ask' policy screening action, the input is initially held 14 by the governance and data protection mechanism, and at least one question is presented to the user, preferably by means of an overlay modal whether the input should be held 14 by a security policy or not. Preferably, the question provides further information on the applicable security policy. This further information may be provided as part of the information output by the user interface, or it may be provided via a link provided to the user at the user interface that enables the user to access the relevant acceptable use policy. Response of the user, i.e. the screening policy prompted input, is preferably received as natural language input, and the screening policy prompted input is logged. The user makes the final decision whether to cancel or continue with submitting the input to the Gen AI application. For example, the user may be provided two alternatives for submitting the screening policy prompted input, first alternative indicating that the user wishes to continue with submitting the input and the other alternative indicating cancelling submission of the input. The screening policy prompted input is logged, but the textual content, i.e. reasoning, does not immediately determine next actions. However, logged screening policy prompted inputs from users may be used by administrators to identify and generate new screening policies. Preferably only after reviewing the acceptable use policy, the user then chooses whether the proxy can continue with submitting the input to the Gen AI application or not. Depending on whether the user decides to continue or cancel submission of the input, the input is then recategorized 15 either as being allowed 12 or as being blocked 16 by the respective content screening policy, and the input is thereafter processed according to the appropriate 'allow' or 'block' policy enforcement action. According to some embodiments, the user may suggest generating a new, organization-wide policy rule. Preferably, such a new policy rule is subject to review and acceptance by an administrator.

An example of an input data type that could fall in the 'ask' category is for example financial data. In the example, the user may copy or attach a greater amount of financial data as input and ask a generic, public Gen AI application to produce a summary thereof. A data security policy implemented in the governance and data protection mechanism recognizes that the input comprises financial data. However, the organization has determined that not all financial data can be fed into this particular Gen AI application. For example, if the financial data is work under progress within the financial department of the organization, it must not be given to a Gen AI application that 1) may use the data for learning and 2) may not be capable of correctly handling this type of data. On the other hand, the financial data comprised in the input may be from a public source, for example a published annual report. In such a case, it can be used as input for a Gen AI application for generating a summary thereof. If the governance and data protection mechanism cannot determine whether inputting the specific financial data in the input is allowable or not, the final responsibility of confirming whether the input can be forwarded to the Gen AI application or not is at the user. On the other hand, if a custom keyword or other clear reason to apply 'block' alternative appears in the input, the input is blocked. By giving the final responsibility to the user, accountability is built while constantly guiding users within the organization to proper usage of Gen AI applications.

Other examples of data types that may fall in the 'ask' category are legal data, for example legal contracts, financial content, political content, medical content, and software, in other words computer program code. Further, input categorization may determine more specific subcategories, and each subcategory may have its specific screening policy. For example, legal data may be further categorized in an organization-specific 'customer contracts' subcategory, on which a strict screening policy is applied. Also, different types of legal agreements may have mutually different screening policies. Another example is that some financial information may be further categorized into a 'public financial' subcategory, and input of 'public financial' data may be generally always allowed while a stricter screening policy of any other 'financial' information.

If a plurality of screening policies would result in 'ask' 13 alternatives, a single question is preferably presented to the user. Alternatively, a question is presented for each screening policy resulting in 'ask' 13 alternatives. In such a case, one or more questions may be presented in the overlay modal. On the other hand, if there are a plurality of questions to be asked, these can be presented one by one, and an acceptable response is required for each question before the input can be forwarded 18 to the Gen AI application.

In addition to allowing or blocking input to be forwarded to the Gen AI application by means of the policy screening, the governance and data protection mechanism tracks and stores all Gen AI application requests. Each Gen AI interaction event by each user is provided with a unique identifier, which is stored in a log with metadata that identifies at least the user, one or more groups the user belongs to, and the input given by the user. Optionally, metadata may comprise one or more or location, timestamp, runtime environment (i.e. operating system and/or browser), authentication token age, and the Gen AI for which the prompt was intended and/or sent. Storing log data enables tracking back all interaction events as well as generating a dashboard that enables AI champions and/or administrators to follow progress in the mission of taking Gen AI into use within the organization as well as coverage of security safeguards provided by the governance and data protection mechanism. This unique identifier is embedded into the result in a form of a text addition, file metadata addition or as an embedded watermark or similar non-removable technical encoding.

The dashboard may specifically indicate friction, which refers in this context to a number or a rate of user interactions where the policy and data security application intervened use of one or more Gen AI applications in a way that was visible to the end user. For example, the dashboard may provide a 'security friction rate' that represents a percentage of user interactions intervened either by blocking interaction or triggering use of 'ask' alternative.

A further feature of the governance and data protection mechanism is that it implements responsible AI that enables tracking, tagging and/or optional watermarking of any Gen AI created results, so that these can be traced back to the Gen AI application, prompt(s), time and user responsible for creating the result. The term 'Responsible AI' refers to functions that enable traceability of Gen AI generated artifacts. Traceability is achieved by embedding identifiers to responses from Gen AI applications.

If all applied screening policies result with the 'allow' 12 alternative either directly (11, 12) or via intermediate processing according to the 'ask' alternative (13, 14, 15, 12), an 'allow' policy enforcement action can be performed, in which case the input can be forwarded 18 from the proxy to the Gen AI application. However, a single atomic 'block' alternative 16 will preferably result in blocking the input 10 from being forwarded to Gen AI.

FIG. 2 illustrates method steps as experienced from a user point of view, when Gen AI application produces Gen AI generated content in response to the user's input, after the input was allowed and forwarded to Gen AI, either directly after determining the input to fall in the 'allow' category, or after receiving a 'screening policy prompted input' that was determined as sufficient to apply the 'allow' category after the input was first categorized into the 'ask' category.

The Gen AI application produces Gen AI generated content in response to the user's input. Depending on the Gen AI application, the Gen AI generated content can be any type of data. It may be text content, either normal text of any type and style, it may be computer program code, image, video, a chemical formula or compound, to name a few. Before the Gen AI generated content is forwarded to the user, it is received 20 by the governance and data protection mechanism, which performs a policy screening to all Gen AI generated content received from the Gen AI application.

Like the input, the received Gen AI generated content is temporarily held by the governance and data protection mechanism and subjected to a data categorization 21 that determines a data type and a content category for the Gen AI generated content according to at least one Gen AI generated content governance policy, referred herein as the use case anti-drift policy. As a result of the policy screening, the Gen AI generated content can be determined to be allowed, referred in short as an 'allow' 22 alternative, in which case it can be forwarded 28 to be displayed to and/or accessed by the user, also referred to as an 'allow' policy enforcement action. If the user is using a chat-type Gen AI application, the Gen AI generated content is preferably provided as result of the user's request in the user interface just as any content provided by the respective Gen AI application.

If the Gen AI generated content comprises any screening policy-forbidden content, the Gen AI generated content is determined as being blocked, referred in short as a 'block' 26 alternative. In such a case, the Gen AI generated content is not forwarded to the user, and the user interface outputs 27 a notification to the user, indicating that the Gen AI generated content was blocked. The user interface also indicates the screening policy that caused the decision. According to some embodiments, the 'block' notification is provided as an overlay modal, which appears in the user interface, or as a separate pop-up window over the normal Gen AI application user interface. According to some embodiments, the 'block' notification, just as any other notification from the governance and data protection mechanism may be included in the user interface of the Gen AI application. For example, if the Gen AI application produces text, notifications and/or generated unique identifiers appear as additional text among the textual output of the Gen AI application.

A third alternative of the policy screening functionality is that it is suspected that the Gen AI generated content may contain data that is against a screening policy. This option is indicated by an 'ask' alternative 23. According to some embodiments, the 'ask' notification is provided as an overlay modal, which appears at the user interface. When the Gen AI generated content falls in the 'ask' category, the Gen AI generated content is initially held 24 by the governance and data protection mechanism, and a prompt, preferably provided as an overlay modal, is presented to the user over the user interface of the Gen AI application with a question, whether the AI generated content is something that is not allowed by the screening policy or not. Preferably, the prompt provides further information on the applicable screening policy. This further information may be showed in the user interface as such, or it may be provided via a link provided in the user interface, that enables the user to be educated about the relevant screening policy, based on which the policy categorization determined that this Gen AI generated content falls in the 'ask' category and thus triggered the 'ask' policy enforcement action. Based on the response of the user given as the screening policy prompted input, the Gen AI generated content is thereafter recategorized 25 either as being allowed 22 or as being blocked 26 by the policy screening, and the Gen AI generated content is then processed according to the selected 'allow' or 'block' alternative as described above.

Like the input, also Gen AI generated content is preferably subjected to a plurality of atomic policy screening processes as illustrated in the FIG. 2, so that the 'allow' policy enforcement action that allows forwarding the Gen AI generated content to the UI as a result is only selected when all applied policy screenings arrive to the 'allow' 22 categories either directly or indirectly via an ask process (23, 24, 25, 22).

Data type categories for input and Gen AI generated content policy screening may be mutually similar, or they may be different from each other.

Figure 3:
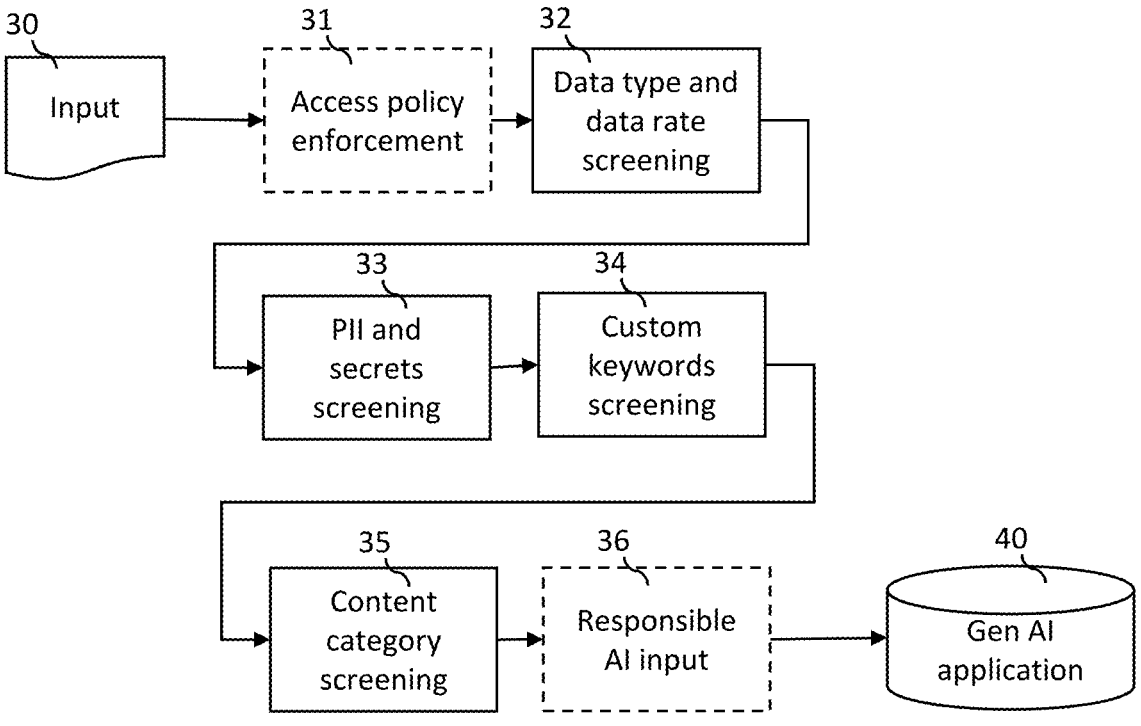
FIG. 3 illustrates steps of processing input.

FIG. 3 illustrates various steps of policy screening input by the governance and data protection mechanism. Order of steps may vary depending on implementation.

Before screening the actual input, the governance and data protection mechanism may optionally perform access policy enforcement (31). This means that it is checked whether the specific user is allowed to use the Gen AI application for which he/she tries to give the input. If the user has no right to use the Gen AI application, the input is categorized as 'block', and the user interface indicates to the user that the input was blocked, because the user has no right to use this Gen AI application. Preferably, the user interface further informs the user about the relevant security policy and possibly gives further information on who to contact within the organization to request rights to use this Gen AI application with the computer device governed by the organization's applicable data security policies. Further information about the relevant security policy may be provided as a link to the relevant security policy available in an intranet of the organization.

The governance and data protection mechanism performs input and/or Gen AI generated content policy screening in several different ways. Preferably, all available policy screening methods are applied at least to input (30), but alternatively, or in some cases, a subset of available policy screening methods may be sufficient. As soon as one policy screening step determines the input as being 'blocked', remaining screening steps may be omitted. Order of policy screening steps may vary from that illustrated in the FIG. 3. For example, policy screening steps may be performed at least partially in parallel to speed up operation of the policy screening. Gen AI generated content is primarily policy screened based on data types and content categories. In the following, applicable policy screening steps are disclosed in more detail.

Data Type and Data Rate Limit Screening

The data type and rate limit screening 32 first determines the data type of each piece of input. For example, data is screened based on whether the input is a picture, a string of text, etc. This enables determining how the input will be handled from this point forward, whether the data type is to be scanned for determining its content or not, whether the user may present this data type to a Gen AI application, and so on. For example, submitting pictures as input may be fully forbidden, and thus any input that tries to submit a picture to the Gen AI is directly categorized as 'blocked'.

According to some embodiments, submission of any data type may be allowed only for one or more predetermined AI services. Thus, in addition to determining the data type, the screening process shall consider whether use of the respective Gen AI application is allowed with this data type. Submission of a data type as input to a specific Gen AI application may be restricted to specific persons within the organization. Any combination of a data type, Gen AI application and/or user identity may be determined as a data type policy. A non-limiting example of a data type policy is that all users may be allowed to submit a picture, but only to XYZ-AI application. Trying to submit a picture to any other Gen AI application would result in blocking the submission by the data type screening of the governance and data protection mechanism.

Optional data rate limit screening refers to limiting the size of binary data to be submitted if the data type is for example a document file, a picture, or a video. This enables for example limiting the amount of text if the input is sending text type data to an API of the Gen AI application or amount of text input in a Gen AI chat window.

PII and Secrets Screening

The PII and secrets screening 33 is configured to detect pieces of information comprised in the input, preferably based on a pattern match. PII and secrets screening is to prevent data leakage from organization to Gen AI applications. Focus of the PII and secrets screening is on personally identified information and typical information technology secrets, such as API tokens.

PII and secrets screening is typically found in data loss protection (DLP) systems. There are several commercially available tools and/or libraries available for implementing PII screening. There are also tools available that can be customized for identifying specific types of PII and secrets.

According to some embodiments, the PII and secrets screening may block any input being forwarded to the Gen AI application, and/or the PII and secrets screening may be configured to remove any PII and secrets from the input data before it is forwarded to the Gen AI application.

Custom Keyword Lists Screening

The custom keyword lists screening 34 is configured to detect pieces of information based on a pattern match on an organization-specific set of keywords or regular expressions. It's up to the customer organization to determine the words and regular expressions that are to be screened and enforced. It can be certain terminology that indicates sensitive material or for example company executive names. Custom keyword lists may be kept up to date by periodically retrieving them from their respective systems of record, like a HR (human resources) database. Keyword lists may comprise one or more keywords, one or more phrases and/or one or more partial words with a wildcard.

Content Category Screening

The content category screening 34 is responsible for identifying content category and optionally content subcategory and to perform content category-based screening. The purpose is to limit the type of data used with a particular application to what is relevant for the use case.

The content category screening is configured to determine if the content is for example legal, financial, political activism, software code or unspecified content type and select among 'block', 'ask' or 'allow' policy enforcement actions based on the content category. Content category screening is preferably based on artificial intelligence and/or machine learning. Content categories are preferably determined by means of artificial intelligence trained with training data representing desired content categories. According to some embodiments, neural network, transformer based or semantic search algorithms-trained using supervised or unsupervised learning model is used that is trained so that the training data creates embeddings for character n-grams (words) and word classifications. Organization-specific content sub-categories can be trained using organization's internal information.

For example, there may be a need to disable using any legal content, such as legal agreements, as input. The legal content main category can further be divided into subcategories, such as 'purchase agreement', 'collaboration agreement', 'employment contract', to name a few, and content category screening policy may be different for different content categories. Submitting content as input for some content category may be allowed for a legal text specific Gen AI application, whereas it should be blocked for any other, especially any generic Gen AI applications. Further, there may be user-based differences in rights to input content categories. For example, legal agreements may be allowed as input by specific users, for example people working in the legal department, for a proprietary Gen AI application that is specifically designed to process data comprised in agreements, but legal agreements shall not be used as input to any public, general use Gen AI applications. The content category screening can be taught to recognize legal content, or any specific type of legal content.

Exemplary high-level content categories that are likely to need dedicated content category screening in an organization like an enterprise, are legal, political activism, healthcare, software, and financial information, but alternative and/or further content categories may be determined according to organization-specific needs. Any high-level content category may also be divided into multiple subcategories.

Figure 4:
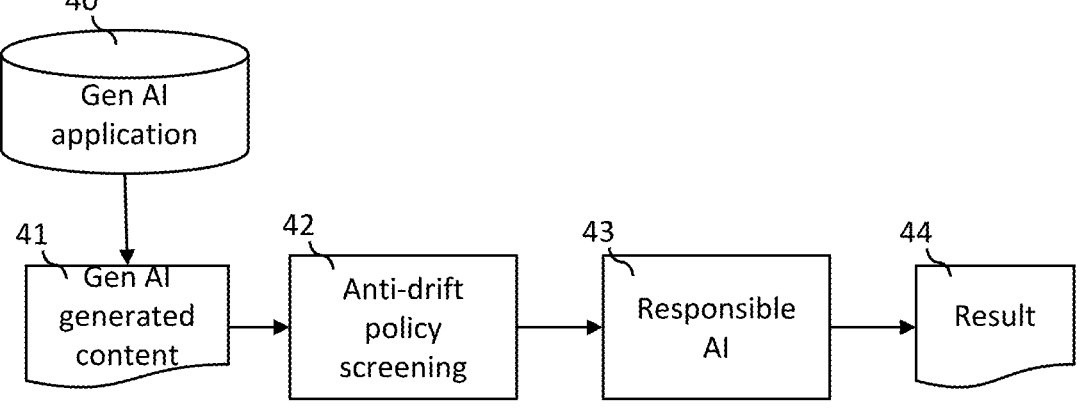
FIG. 4 illustrates steps of processing Gen AI generated content.

FIG. 4 illustrates steps of processing Gen AI generated content.

Content Category Screening and Use Case Anti-Drift Policy

Content category screening is also applied to Gen AI generated content provided by the Gen AI application. The 'block', 'ask' and 'allow' actions for Gen AI generated content are configured in an 'use case anti-drift policy screening', referred in short as the 'anti-drift policy screening' 42, and only Gen AI generated content that falls in 'allow' category is made available for the user as a result 44. Before forwarding the Gen AI generated content, responsible AI 43 functionality embeds a unique identifier in the Gen AI generated content. The unique identifier may be embedded into the result as a text addition, as file metadata addition or as an embedded watermark or other non-removable technical encoding. Text addition is particularly useful for text-format Gen AI generated content, whereas watermarks are preferred for image and video type content. File metadata is applicable to any types of files comprising metadata. Furthermore, other known or future methods of embedding unique identifier as non-removable technical encoding are applicable.

Screening policies for content category screening concerning input and the anti-drift policy screening concerning Gen AI generated content may be configured separately, because these may have different characteristics. However, coordination in enforcement between applied screening policies is preferred to avoid poor user experience. Alternatively, the same content screening may be applied both for input and Gen AI generated content.

In addition to applying content category screening 35 on the input, content category may be assessed as part of the 'anti-drift policy screening' 42, where the purpose is to apply a dedicated content category screening policy to the content generated by Gen AI applications. For example, general purpose chatbot like ChatGPT should not be used to generate computer program code or to produce legal content. This would be very risky, since it is known that ChatGPT may 'hallucinate' and for example can create legal content that is not grounded to any facts, or it could generate computer program code that does not actually work or could cause security risks. Only Gen AI tools specifically designed for those specific use cases should handle such content, and selection of applicable Gen AI applications for specific types of content is governed by the governance and data protection mechanism. Also, specific content types like legal text or software should be subjected at least to a review by a skilled person before they are taken into business use, so that people don't try to become 'amateur attorneys' or an 'amateur coders' with the help of a generic Gen AI tool.

An exemplary case occurs when a user asks a generic-use Gen AI tool such as the ChatGPT to create a piece of software code to do a particular algorithm. The governance system may be configured to select 'ask' for software content category, and 'allow' category for any other type of content. The input by the user may not contain any software and therefore it is categorized as other (not software) and the input is regarded to fall under 'accept' alternative and is thereafter submitted to ChatGPT (or some other general use Gen AI application). But since the request was to generate software code, Gen AI generated content from the ChatGPT contains software, and thus the Gen AI generated content from the ChatGPT falls in the 'ask' category, and the user needs to be prompted by the user interface at that point, and a screening policy prompted input is expected before a decision between categories 'allow' and 'block' is allowed.

Figure 5:
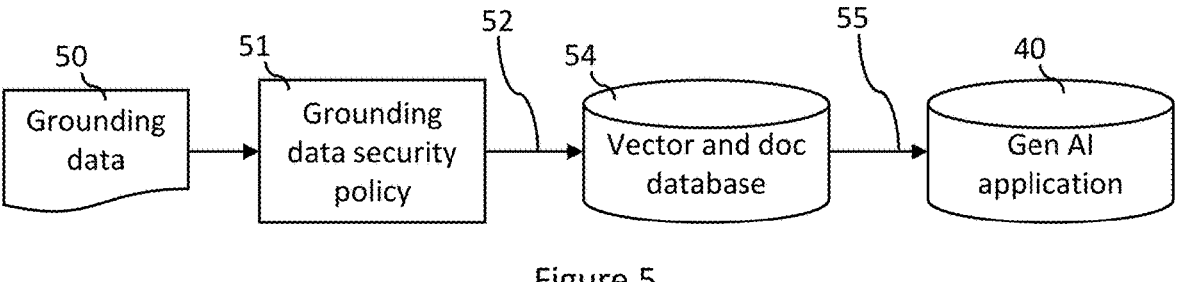
FIG. 5 illustrates steps of processing grounding and training data fed towards a Gen AI application.

FIG. 5 illustrates steps of applying governance and data protection to grounding and training data uploaded to a Gen AI application. Grounding data refers to selected data that is uploaded by the administrator as clean source data that will then be used for grounding. As known in the art, grounding refers to is the ability to connect Gen AI generated content to verifiable sources of information. Using grounding for a Gen AI model with access to specific data sources, the grounding tethers the Gen AI generated content to the grounding data and reduces the prompting effort by the end user, as well as the risk of hallucinations.

According to embodiments, grounding and training data is uploaded as the clean source data in a 'clean room', in other words a dedicated storage via a clean room verification process that ensures that only documents that comply with the data security policy become accessible by a Gen AI service. This way Gen AI accesses only documents of allowed (sub) categories and the organization avoids leaks of PII and secrets. All document movements are logged at the metadata level.

A dedicated upload data security policy is applied to all grounding and training data. It is typically not possible to enforce grounding data at the user level or at a use case level, since it is not known at the time of the uploading the grounding data who will use it and for what purpose. In use, anti-drift policy screening is the most productive point of enforcing a screening policy on user level and/or on use case level. For grounding data uploading, the same content categorization can be applied as for input and Gen AI generated content. However, different screening policies can be applied for input, Gen AI generated content and uploading any type of input and/or grounding data.

All data that is uploaded can be saved into a vector and document database 54, which enables Retrieval augmented generation (RAG) by the Gen AI application based on data stored in the vector and document database 54. RAG is a known natural language processing (NLP) technique that combines the strengths of both retrieval-based and generative-based artificial intelligence (AI) models. Vector and document database 54 may be internal to or external from the system that implements the governance and policy enforcement application. For security reasons, it may be preferred to use an external vector and document database, i.e. that is governed by the organization that owns the uploaded data.

For enabling blocking of Gen AI generated content from being provided to the user, the Gen AI generated content is cached at a proxy until policy enforcement actions are complete, and only then released to the user. The proxy maintains a record of the content categorization of the input in order to execute the screening policy at the time of outputting the Gen AI generated content. The input and Gen AI generated content inspections are mutually linked and logged as policy events under the same interaction log event.

Result of content categorization of both input and Gen AI generated content following each prompt or request from the user is recorded in a log. The log entry needs to distinguish input and Gen AI generated content, and the Gen AI generated content may be stored as well as the input, even if the Gen AI generated content is not released back to the user as result.

An example of an overlay modal produced by the policy screening function preferably displays the user a text that indicates the decision made by the policy screening function as well as reasons for the decision. For example, the overlay modal may indicate that '[Gen AI application] is not approved for [content type] content' in case of 'block', or '[Gen AI application] should be used for [content type] only as defined in [policy link here]. Please write a business justification to continue'. If both the input and the Gen AI generated content are categorized as 'allow', no overlay modal needs to be presented in the user interface, but the Gen AI generated content of the Gen AI application is provided to the user in response to the original request made by the user. If both input and the Gen AI generated content are categorized as 'ask', only the 'ask' related to the input is presented to the user. Any business justification is considered to cover both input and Gen AI generated content.

According to some embodiments, each overlay modal further shows the unique identifier provided to the respective input or Gen AI generated content. This enables the user to identify the input or Gen AI generated content if he/she finds the decision made by the policy screening to be inappropriate. This facilitates efficient communication with responsible parties within the organisation and enables investigating the input and/or Gen AI generated content that was allegedly handled incorrectly by the screening policy, and to take corrective action. According to some embodiments, the unique identifier is provided and displayed to the user irrespective of the applied policy enforcement action.

Figure 6:
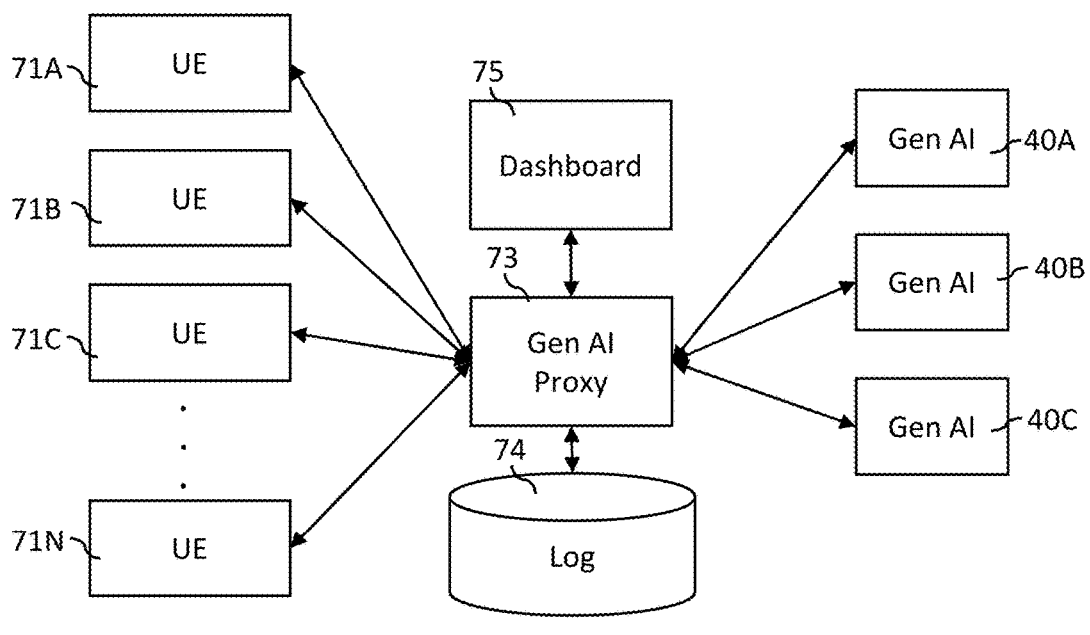
FIG. 6 illustrates an exemplary system for implementing the governance and data protection mechanism.

FIG. 6 illustrates an exemplary system for implementing the governance and data protection mechanism to a customer organization in a regional setup. The Gen AI Proxy is set up to the same region as the customer organization's setup and required traffic is routed to the Gen AI application that the user wants to use.

According to some embodiments, the governance and data protection mechanism for named Gen AI applications is provided by onboarding the named Gen AI applications to a proxy functionality 73 that proxies all input from the user equipment, UE (71A, 71B, . . . 71N) and Gen AI generated content from the named Gen AI applications (40A, 40B,

40C) and enforces the screening policies of the governance and data protection mechanism and performs logging of both outward and inward activities related to the named Gen AI applications. New Gen AI applications can be onboarded to the proxy based on needs of the organization. The proxy functionality 73 produces log data that is stored to a logging functionality 74. The proxy functionality can be implemented in one or more dedicated servers or as a Software as a Service (SaaS) solution, which may be provided by a cloud computing service. A dashboard 75 is communicatively coupled to the proxy functionality 73. The dashboard 75 is configured to access log data stored in the logging functionality 74 for enabling use of the log data for administrative purposes.

Figure 7:
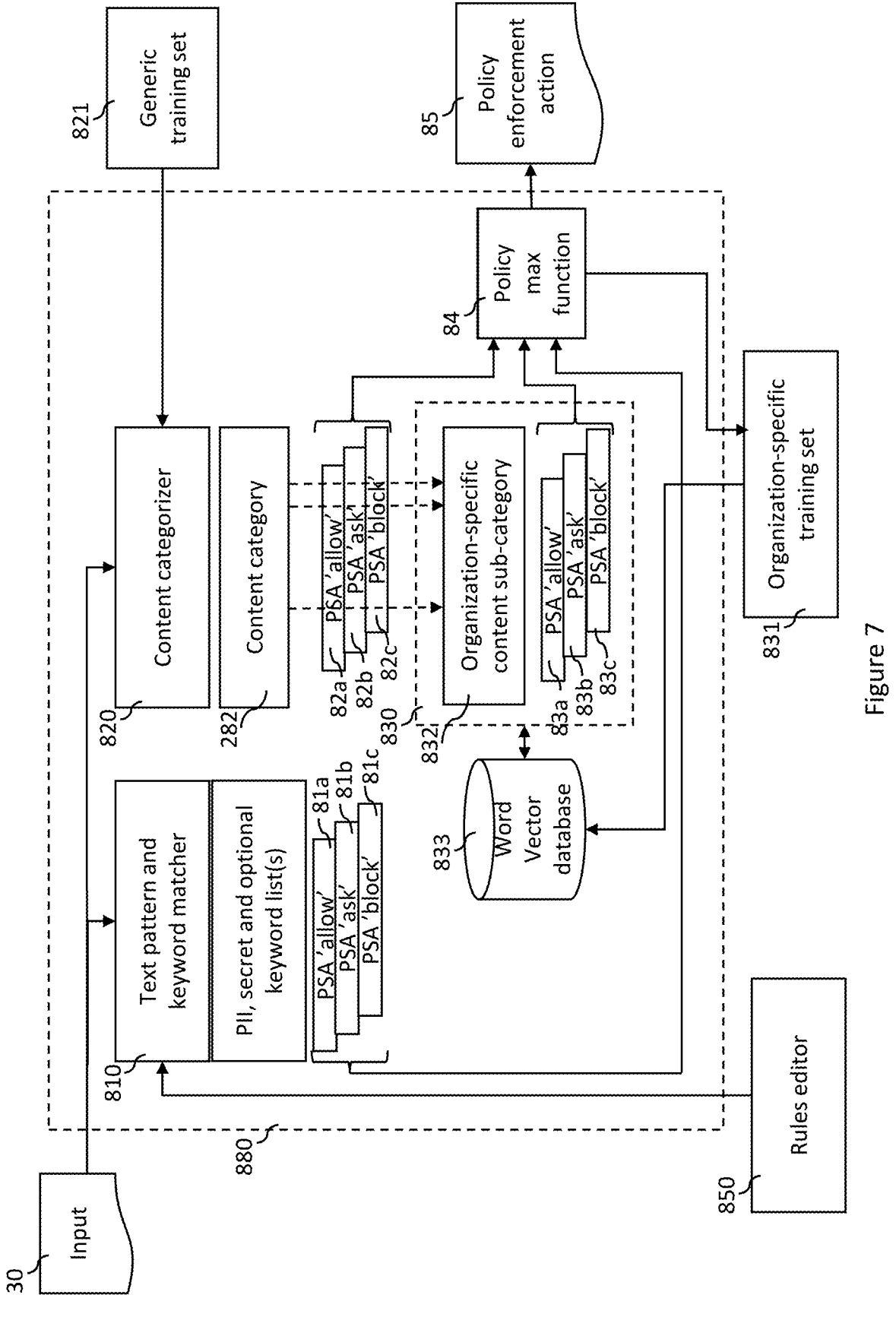
FIG. 7 illustrates a software module that implements content categorization and policy enforcement.

FIG. 7 illustrates an implementation of policy screening by a content categorization and policy enforcement software module 880 according to some embodiments. FIG. 7 illustrates how policy screening performed by different submodules using various different screening policies can be further combined into a single policy enforcement action 85. This example of FIG. 7 is provided with respect to input from the user, but the same or a like software module can be configured to handle Gen AI generated content/results.

Input 30 received via the user interface is processed by a pattern and keyword matcher module 810 configured to check whether the input comprises text patterns and optional custom keywords indicating that the input includes PII or secrets or matches predefined keywords in one or more optional custom keywords lists. If a match is found between the input and one of more of the PII, secrets and optional keyword list(s) by the text pattern and keyword matcher 810, one of the possible policy screening actions, PSA, is selected among the available alternatives, preferably 'allow', 'ask' and 'block' (81a, 81b, 81c) as determined by the respective policy. A rules editor 850 enables determining applicable text patterns and keywords used for text pattern and keyword matching. The rules editor 850 may be incorporated in a management interface provided for administrators for managing operation of the governance and data protection mechanism.

The input 30 is also fed into a content categorizer 820, which determines a content category 822 of the input.

According to some embodiments, the content categorization applies machine learning for enhancing the content categorization and policy screening that is based on the content categorization. This enables generation and continuous improvement of custom, organization-specific content sub-categorization 830.

In this example, the content categorizer 810, which may be characterized as a generic use content categorizer, is trained with a generic training set 821. An exemplary generic training set comprises training data that enables recognizing at least one of legal text, financial text, and software code, but it is not optimized for any organization nor taught by any organization-specific material.

Based on content category determined by the content categorizer 820, one of the available policy screening actions is assigned to the input, wherein the policy screening action is selected among the available policy screening action alternatives, preferably 'allow', 'ask' and 'block' (82a, 82b, 82c) alternatives as discussed above.

If the organization has determined any content sub-categories 832, the initially categorized input 30 is subjected to an organization-specific content sub-categorization 830. The organization-specific content sub-categorization may be performed using results of content categorization by the content categorizer 820 as pre-categorization, or the organization-specific content sub-categorization 830 may be a separate process that omits any results of the content categorization 820. If the input 30 is determined to belong to any one of the organization-specific content sub-categories 832, respective policy screening action is selected among available policy screening action alternatives 83*a*, 83*b*, 83*c*. Preferably, these alternatives may comprise the same 'allow', 'ask' and 'block' alternatives as discussed above.

According to some embodiments, the generic content categorization by the content categorizer 820 is omitted, and content is solely categorized into custom content—subcategories 832.

As a result, there may be three different policy screening actions determined for the same input 30, selected by three different software submodules. According to this example, for determining the final policy enforcement action 85 to be performed, a policy max function 84 is provided that compares selected alternatives among possible policy screening actions (81*a-c*, 82*a-c*, 83*a-c*) and preferably selects the strictest one as the policy enforcement action to be performed for the respective input. If all determined policy screening actions (81*a-c*, 82*a-c*, 83*a-c*) are determined to be 'allow', the input can be allowed. If one or more of the policy screening actions are 'allow', but one is 'ask', the 'ask' procedure is initiated, prompting the user to submit reasons why the input should be allowed, and final decision on the policy enforcement is made in dependence of the response from the user. If any one of the policy screening actions is determined to be 'block', the final policy enforcement action is 'block'.

If the policy enforcement action is determined to be 'ask', the process continues to provide a prompt to the user in the user interface, prompting the user to provide reasoning that is then used to determine the final policy enforcement action, which should be one of 'allow' and 'block' as illustrated in FIGS. 1 and 2.

FIG. 7 further illustrates principles of training of the organization-specific content sub-categorization. Based on the policy enforcement action 85 determined by the policy max function 84, the input may be added to an organization-specific labelled training data set 831, which is used to further training of an organization-specific word vector database 833 that is applied for the custom, organization-specific content sub-categorization. Continuous improvement of the organization-specific sub-categorization is achieved by the learning cycle that takes in end-user feedback on categorization results and uses respective input as additional, organization-specific training samples. According to some embodiments, the word vector database 833 is updated using k-nearest neighbour (k-NN)-based search against organization-specific labelled input sample data. According to some embodiments, an administrator labels input sample data that is obtained from the policy max function, thereby confirming whether the determined policy enforcement action 85 for each input 30 to be used as part of the organization-specific labelled training data set 831 was correct or not.

By applying a word vector database for categorizing input and Gen AI generated content into organization-specific content sub-categories, no actual customer training data needs to be held by the governance and data security application after the learning process has been performed.

Figure 8:
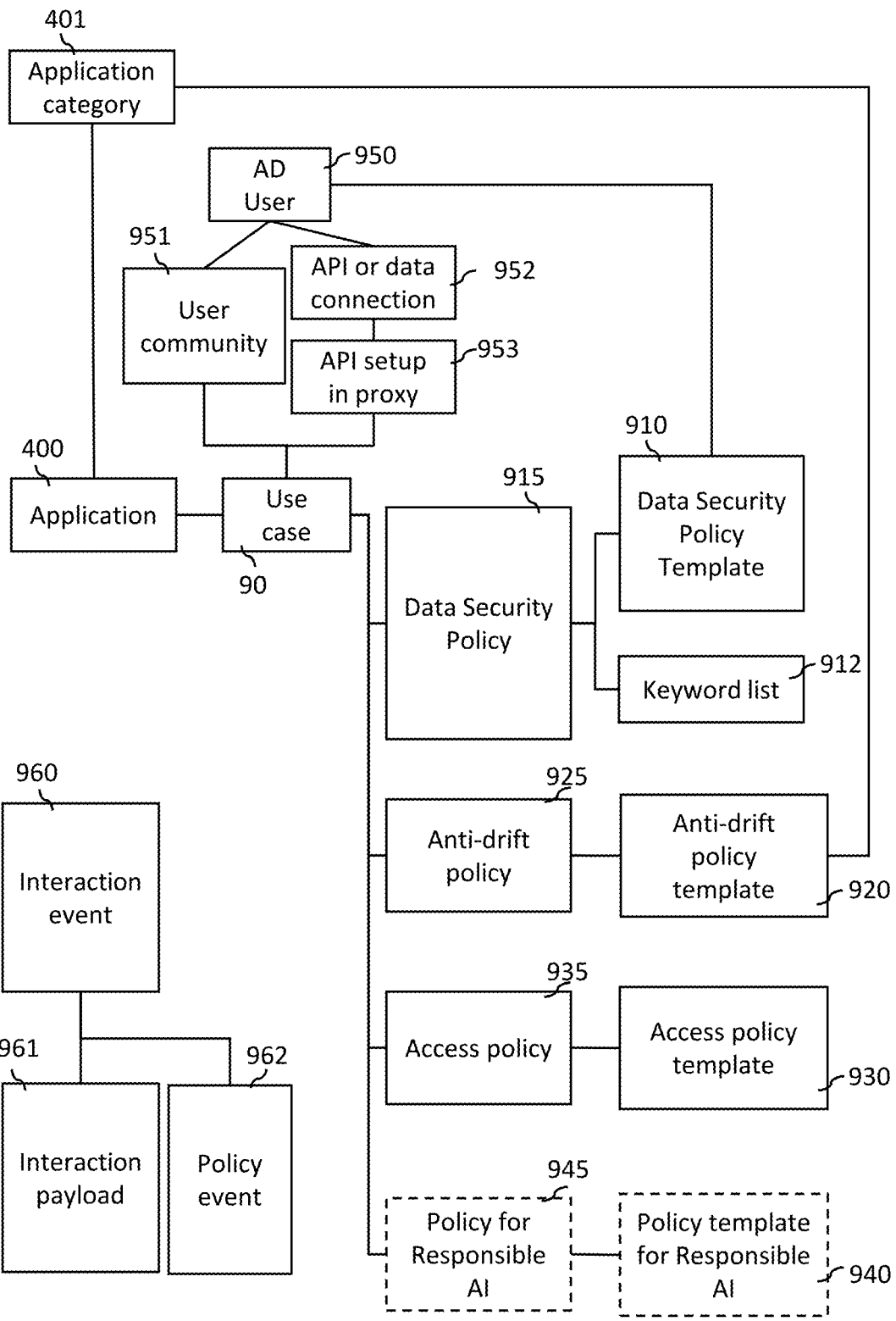
FIG. 8 illustrates a data model.

FIG. 8 illustrates an exemplary data model for implementing the governance and data protection mechanism.

The data model comprises common data model entities, which are applicable to all organizations, organization-specific data model entities, which enable organizations to configure operation of the governance and data protection, and further organization-specific, private data model entities that are external to the governance and data protection mechanism. As understood by a skilled person, names of different data model entities can be freely chosen and are not limited by this example.

'Application' 400 is an entity that determines web address (es) and/or name(s) of the Gen AI application(s) to which the governance and data protection system is applicable. The web address of the Gen AI application may be a Uniform Resource Locator (URL). 'Application' 400 may further determine risk attributes of the application and/or the vendor of the application. Risk attributes are a computation that takes into account the security maturity of the respective Gen AI application, any threat intelligence findings, customer-defined policies and observations of actual usage. For example, a Gen AI application that does not carry the organization required compliance certifications preferably causes raising a risk flag.

'Application category' 401 is an entity that determines an operating domain of the Gen AI application. For example, the operating domain of a Gen AI application may be categorized as a generic chatbot, or it may be any type of dedicated Gen AI application, for example designed for legal, marketing, software development, or customer service.

'Use case' 90 is a customer-buildable entity that comprises a set of policies that are delivering the use case. For example, if the customer organisation wants to use GitHub Copilot for software code generation, they enable this by forming a use case. Desired users and/or user groups are connected to the use case, and then policies are determined that allow users to use the GitHub Copilot for software generation but disallow users from requesting and/or receiving software code from any other system than Github copilot.

Content screening by the governance and data protection mechanism is implemented by means of one or more screening policies, and operation of the screening policies is determined by respective templates.

'Data Security Policy Template' 910 determines block/ask/allow categories for various input/Gen AI generated content/upload data types, PII and secrets, as well as content categories to be used for content screening. An example of a 'Data Security Policy Template' 910 for input and Gen AI generated content content categories is provided in connection with FIG. 6. The 'Data Security Policy Template' for PII and secrets may simply determine 'block', or the 'Data Security Policy Template' for PII and secrets may be used for facilitating removal of any PII and secrets from input and/or uploaded grounding data. Optionally, at least one 'keyword list' 911 may be provided by an organization as an additional template for facilitating data protection. The 'keyword list' 911 can be considered as a template since it partially determines the operation of a screening policy. For example, names or phrases identifying at least one of company executives, project or product names, project or product nicknames, customer names, or other possibly sensitive information may be determined in the keyword list that cause categorizing input and/or upload content into one of categories 'block' or 'ask'.

'Data security policy' 915 is an organization-specific entity that enforces data security policies determined by one or more data security policy templates and optionally one or more keyword lists. The 'Data security policy' 915 also enforces optional data rate limits, if applied for content screening. The 'Data security policy' 915 applies configurable content screening on input and on the grounding data, if grounding data may be uploaded to any Gen AI application, based on the data security policy template(s), determining which one of the 'allow', 'ask', and 'block' policy screening actions should be taken. If a keyword list is provided, the 'data security policy' enforces content screening based on provided keywords, determining whether 'allow', 'ask', and/or 'block' actions should be taken if any one of the keywords is found in the input or uploaded grounding data.

'Anti-drift Policy Template' 920 determines 'allow'/'ask'/ 'block' categories for Gen AI generated content data types and content categories. 'Anti-drift policy' 925 is an organization-specific entity that enforces anti-drift policies determined by one or more anti-drift policy templates 920, determining whether 'allow', 'ask', and/or 'block' policy screening actions should be taken for Gen AI generated content data types, according to the at least one anti-drift policy template.

'Access policy template' 930 determines applicable 'allow'/'block' categories for accessing data within the governance and data protection mechanism. This is particularly intended for organizations applying single sign-on, SSO. Organizations can define different groups of users in their cloud-based identity and access management service, such as Microsoft® Entra ID. Access policies can be determined based on these groups of users. Various criteria may be used to determine rules of access rights and access right granting attributes for the groups. For example, one or more groups of users may be allowed to use ChatGPT, and another group of users may be allowed to access both Gemini and ChatGPT applications. 'Access policy' 935 is an organization-specific entity that enforces access policies determined by one or more access policy templates.

'Policy template for Responsible AI' 940 determines actions on inputs to Gen AI applications and actions on Gen AI generated content. The policy template for responsible AI determines actions on inputs to Gen AI applications and/or actions on Gen AI generated content. Certain actions are preferably always performed based on the policy template for Responsible AI, such as generating a unique identifier for each prompt by the user and/or for each Gen AI generated content and/or response from the Gen AI application. Furthermore, all generated unique identifiers are preferably provided to the user, typically displayed in the user interface to facilitate ease of finding and referring to any specific Gen AI application interaction later. Tracking and tagging should be performed every time. Furthermore, optional watermarking of images output as Gen AI generated content can be determined by the responsible AI template. 'Policy for responsible AI' 945 enforces these policies set for responsible AI: s.

The data security policy 915, the anti-drift policy 925, the access policy 935 and the policy for responsible AI 945 are all examples of screening policies.

'AD user' 950 is an organization-specific entity typically outside of but accessed by the governance and data protection mechanism. The 'AD user' 950 determines usernames and user group information for users in the organization.

The 'user community' 951 determines a subset of users within the organization. According to some embodiments, the 'user community' 951 only determines users that may use Gen AI applications. If a user is not found in the 'user community' 951, all use of Gen AI applications may be blocked. According to some embodiments, the 'user community' 951 determines all users in the organization. For example, a user community may comprise software developers who are allowed to use a certain software generation capable Gen AI application for generating software code. Another user community may comprise legal personnel who are allowed to use a specific legal Gen AI application for generating legal texts. 'User community' 951 may be defined as a set of Boolean logic statements that refer to user attributes stored in a user directory of the organization.

The 'application' 400 and 'user community' 951 entities are used in combination to determine the 'use case' 90, which determines which screening policies are to be applied. In other words, to select which screening policies to apply to a particular input from the user, it is first checked which user community or communities the respective user belongs to, and it can be determined which screening policies apply to the respective user community or user communities the user belongs to and the Gen AI application that is being used. 'API or Data connection' 952 determines secrets used in APIs and/or data connections of the organization as well as service accounts of administrative users. This enables setting up APIs for the proxy by the 'API setup in proxy' 953 of the governing and data protection application, but also provides information on API related secrets that must be blocked from being included in input.

The data model further comprises entities for logging interaction between users and the Gen AI applications.

'Interaction event' 960 preferably comprises a time stamp indicating when the interaction occurred, identifies the use case, user, any input and/or prompt provided to the user, and user input capture, which may comprise a response form the user when the user provides the screening policy prompted input via the user interface for further justification for using the input in an 'ask' situation. As described above, prompt may be included in an overlay modal. Alternatively, a prompt to the user may appear as part of the normal Gen AI user interface as if it was part of the Gen AI interaction. The interaction event further includes Gen AI response, irrespective of whether it was provided to the user as result or held back by the policy screening. The interaction event entity may further comprise success and/or failure codes. Success and/or failure codes enable quickly identifying mutually similar interaction events that cause similar end result. Success and/or failure codes are beneficially applied when the governance and data protection mechanism is used on API traffic. According to some embodiments, success and/or failure codes can be determined like HTTP response status codes commonly used with Internet browsers.

The interaction event entity may comprise two types of data structure entities referred herein as an 'Interaction payload' 961 and a 'Policy event' 962.

The 'interaction payload' 961 comprises a unique identifier of the interaction, which may be a hash to a tag. The 'interaction payload' 961 further comprises the request or prompt by the user as well as the response from AI, and any additional payload or metadata content, for example text or file reference uploaded as part of the input or provided as grounding data. The 'Policy event' 962 comprises detailed data concerning enforcement of the content screening policy, such as the time stamp, applied screening policy (whether the data security, access, anti-drift or responsible AI policy was applied on input and/or Gen AI generated content), description of the action taken, capture of user input, if any, and success/failure codes.

Figures 9A, 9B:
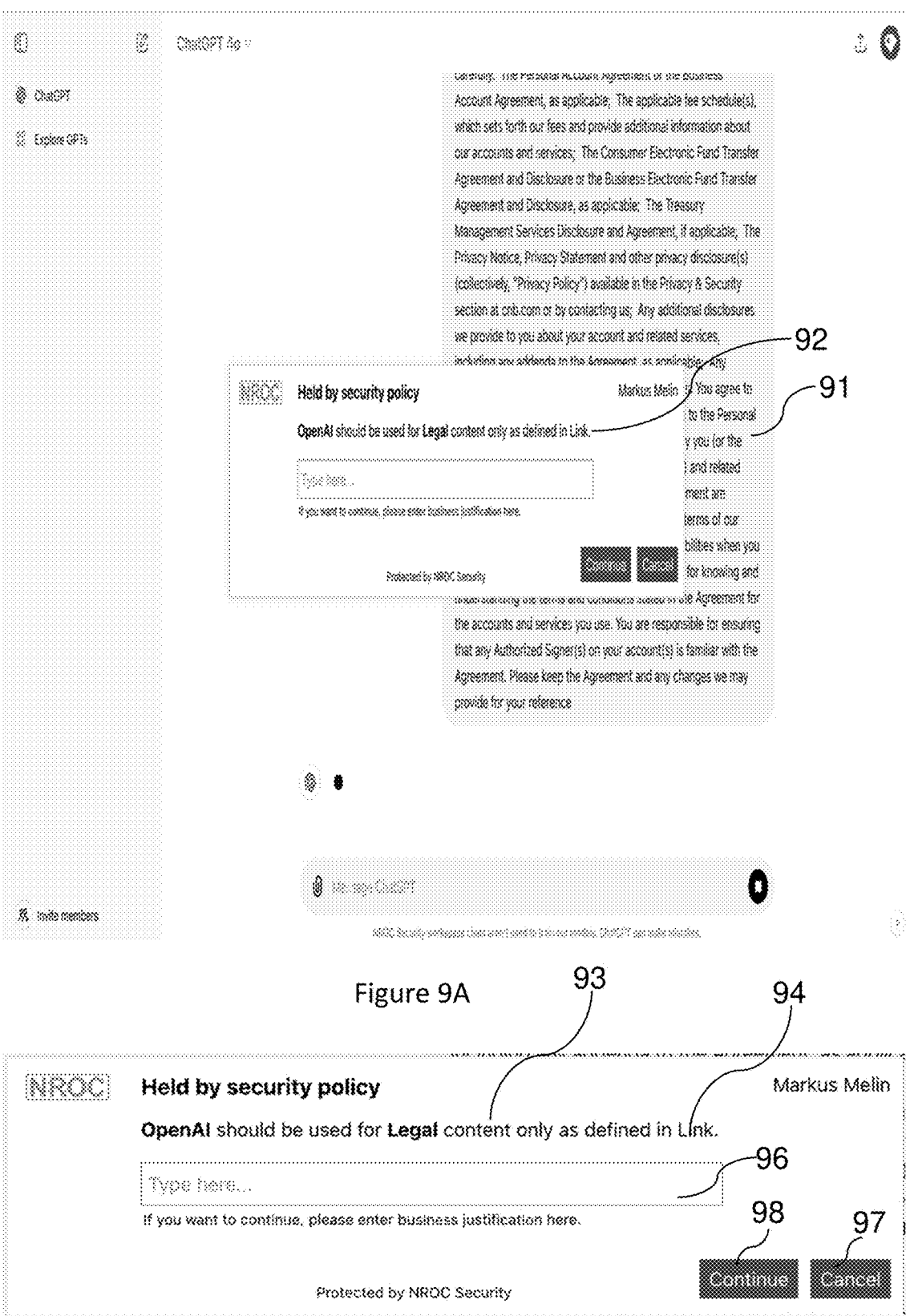
FIGS. 9A and 9B provide an example of user interface upon determining that input is in 'ask' category.

FIG. 9A illustrates another exemplary chat session with generic use ChatGPT. In the normal ChatGPT user interface, the user tries to input 91 some legal text, for example copied from an agreement. The input is held in the proxy and compared with at least one applied policy. A content categorization is performed, and the input is recognized as legal text. The input is therefore categorized into the 'ask' category, since the organization has determined a policy for submitting legal text to ChatGPT as input. Processing of the input is halted, while the overlay modal 92 is presented to the user.

FIG. 9B shows an enlarged view of the overlay modal 92 shown in the FIG. 9A. The overlay modal 92 gives a short explanation 93 and provides a link 94 to a further document that describes the applied policy for using ChatGPT or other open Gen AI application with legal text. The user is provided with a prompt to give a business reasoning 95, if he/she decides to continue with submitting the input to ChatGPT. The reasoning given by the user can be used by administrators to make enhancements and/or corrections to the policy, if needed. Final decision on whether to continue 98 or cancel 97 submission of the input to the ChatGPT is at the user. If the user selects continue 98, the input is forwarded from the proxy to ChatGPT. If the user selects cancel 97, the input is not forwarded to ChatGPT. In both cases, a unique identifier is determined for the interaction, which is logged in the log file.

Figures 10A, 10B:
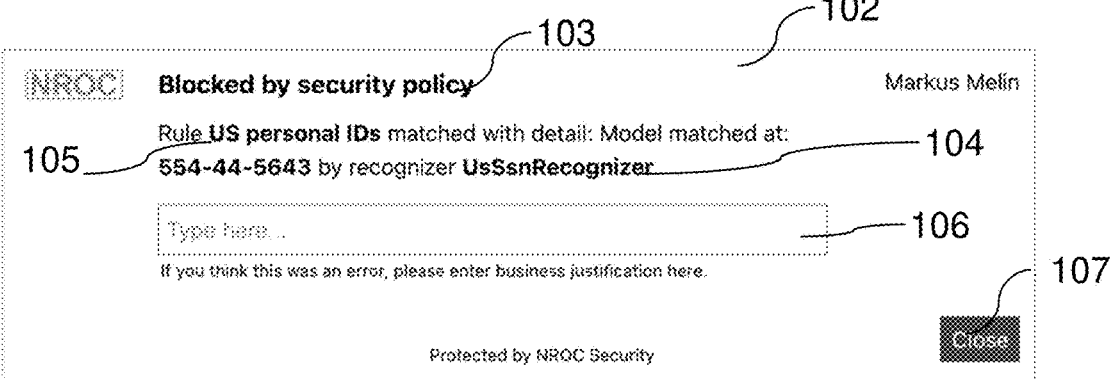
FIGS. 10A and 10B provide an example of user interface upon determining that input is in 'block' category.

FIG. 10A illustrates another exemplary chat session with generic use ChatGPT. In the normal ChatGPT user interface, the user tries to use a SSN as input 101. The input is held in the proxy and compared with at least one applied policy. The PII and secrets screening recognizes that this input comprises information that is not allowed to be submitted as input. The input is thus categorized into the 'block' category. A 'block' policy enforcement action is then performed. Processing of the input is stopped, and the input is not submitting to the Gen AI application. In this example, the user interface implements an overlay modal 102 that indicates to the user the policy enforcement action that was triggered by the input. The user interface further provides a unique identifier 103 that identifies the interaction that is also stored in the log.

FIG. 10B shows an enlarged view of the overlay modal 102 shown in the FIG. 10A. The overlay modal 102 identifies 103 the policy enforcement action, which in this case is associated with 'block' categorization. The displayed reasoning refers to a respective screening policy 104 that caused the input to be categorized into the 'block' category. The reasoning preferably provides a link 105 to the applied policy. Preferably, the reasoning text or a part of the reasoning text is used to provide the link 105. The user is preferably provided with an opportunity to give a reasoning text 106, if he/she thinks the blocking enforcement action was an error. This enables administrators to make enhancements and/or corrections to the policy, if needed. Since the 'block' policy enforcement action cannot be overcome by the user, only option provided to the user is to close the overlay modal using the close-button 107.

Although examples provided in FIGS. 9A, 9B, 10A and 10B are given in relation to ChatGPT, a skilled person understands that like interactions are applicable to any type of Gen AI application.

Figure 11:
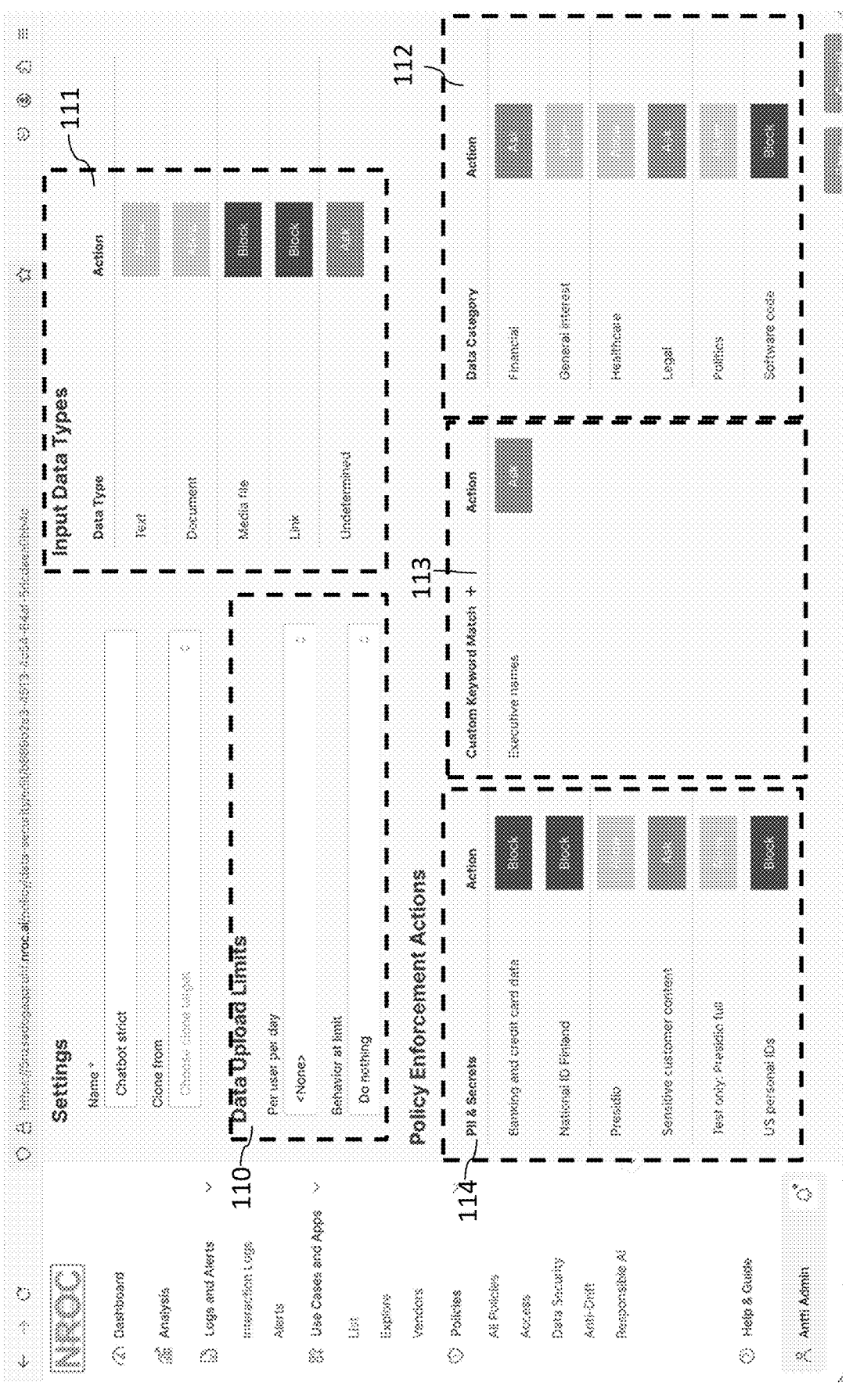
FIG. 11 illustrates an exemplary administrate user interface.

FIG. 11 illustrates an exemplary administrative user interface that shows high-level selections for different screening policies. The administrative user interface may enable determining data upload limits 110 for example per user per day, and if a data upload limit is determined, the applied behaviour in case of achieving/exceeding the data upload limit is determined. The administrative user interface may enable determining policy enforcement actions based on input data types, as illustrated with box 111. In this example, there are individual settings for text, document, media file, link, and undetermined data types. The administrative user interface may also enable determining policy enforcement actions for various types of custom keywords, as illustrated with box 113. In this example, a custom keywords list is provided that includes company executive names, and input is to be categorized into 'ask' category, if any of the company executive names is found in the input. The administrative user interface preferably enables determining policy enforcement actions per data category as illustrated with box 112. The administrative user interface preferably enables determining policy enforcement actions for different types of PII and secrets, as illustrated with box 114. In this example Banking and credit card data, National ID Finland and US personal IDs are always to be 'blocked'.

The term 'computer' refers to any electronic device comprising a processor, such as a general-purpose central processing unit (CPU), a specific purpose processor or a microcontroller. A computer is capable of receiving data (an input), of performing a sequence of predetermined operations thereupon, and of producing thereby a result in the form of information or signals (an output). Depending on context, the term 'computer' will mean either a processor in particular of can refer more generally to a processor in association with an assemblage of interrelated elements contained within a single case or housing.

The systems and methods described herein may be embodied by a computer program of a plurality of computer programs, which may exist in a variety of forms both active and inactive in a single computer or across multiple computer systems. For example, they may exist as software program(s) comprised of program instructions in source code, object code, executable code or other formats for performing some of the steps. Any of the above may be embodied on a computer readable medium, which include storage devices.

As used herein, a 'computer-readable medium' or 'storage medium' can be any means that can contain or store, the program for use by or in connection with the instruction execution system, apparatus, or device. The computer readable medium can be, for example but not limited to, an electronic, magnetic, optical, electromagnetic, infrared, or semiconductor system, apparatus or device. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), and a portable compact disc read-only memory (CDROM).

The invention claimed is:

1. A method for governing a generative artificial intelligence (Gen AI) interaction to prevent unauthorized disclosure of data, the method comprising:

receiving input destined to a Gen AI application via a user interface, temporarily storing the input in a proxy, determining a use case based on a user group of a user from which the input is received and the Gen AI application the input is destined to, selecting a Gen AI use policy to be applied based on the use case, wherein the applied Gen AI use policy defines a plurality of screening policies determined for a content category comprised in the input and one or more of a data type, a data rate, personally identifiable information, and a custom keyword list, wherein the content category of the input or a part of the input is determined by a content categorizer trained to recognize at least one of: text with legal content, text with financial content, text with medical content, text with political content, computer program code and organization-specific content, applying a policy screening on the input according to the Gen AI use policy applied on the use case, wherein the policy screening comprises categorizing the input into one of 'allow', 'ask' and 'block' categories, and performing at least one policy enforcement action depending on the categorization of the input, wherein the at least one policy enforcement action is selected among:

a) an 'allow' policy enforcement action causing passing the input from the proxy to the Gen AI application, selected in response to categorizing the input into 'allow' category by all of the plurality of applied screening policies, b) a 'block' policy enforcement action, selected in response to determining that the input and/or at least one piece of data comprised in the input is determined to be in the 'block' category in the use case, the 'block' policy enforcement action causing the policy screening to stop processing of the input, not submitting the input to the Gen AI application, and the user interface displaying in the user interface a reason for blocking the input, wherein the displayed reason refers to a respective screening policy that caused the input to be categorized into the 'block' category, c) an 'ask' policy enforcement action, selected in response to determining that neither the input nor any piece of data comprised in the input is determined to belong in the 'block' category, and the input or at least one piece of data comprised in the input is determined to be the 'ask' category for the use case, the 'ask' policy enforcement action causing the user interface to request the user to enter a decision on whether to continue with passing the input from the proxy to the destined Gen AI application or not by:

indicating the input or the at least one piece of data comprised in the input that caused the input to fall in the 'ask' category and providing in the user interface information or a link to information that describes a respective screening policy causing the input or at least one piece of data comprised in the input to cause the input to be categorized into the 'ask' category, providing in the user interface a prompt to submit a screening policy prompted input comprising a rationale, upon receiving, via the user interface, the screening policy prompted input, logging the screening policy prompted input, receiving, from the user via the user interface, any one of an indication to continue with the Gen AI application interaction and an indication to cancel the Gen AI application interaction, and in dependence of the indication received from the user via the user interface, performing the respective policy enforcement action a) or b).

2. The method according to claim 1, wherein the method further comprises:

categorizing the input into one of 'allow', 'ask' and 'block' categories based on a plurality of screening policies, wherein said plurality of screening policies determine said 'allow', 'ask' and 'block' categories based on at least two of:

one or more data types, wherein the one or more data types is selected from a list comprising: text, image, video, computer program code, personally identifiable information and/or secrets, one or more content categories, wherein the content category of input is selected from a list comprising at least two of: computer program code, text with legal content, text with financial content, text with political content, text with medical content.

3. The method according to claim 2, wherein the method further comprises:

providing a custom keyword list, wherein the optional custom keyword list determines one or more keywords and/or one or more phrases and/or a vector and/or one or more partial words with a wildcard.

4. The method according to claim 2, wherein the method further comprises:

providing one or more data rate limits, wherein data rate limit refers to a limit of size of binary data to be submitted as input.

5. The method according to claim 2, wherein the content category of the input is determined by means of artificial intelligence trained with general use training data representing one or more predetermined content categories and/or organization-specific training data representing one or more organization-specific content categories and/or one or more organization-specific content sub-categories.

6. The method according to claim 5, wherein training data for training artificial intelligence used for determining one or more organization-specific content categories and/or organization-specific content sub-categories comprises previously categorized input and/or Gen AI generated content, wherein each previously categorized input and/or Gen AI generated content included in the training data is organization-specific labelled training data, wherein the organization-specific labelling indicates the organization-specific content category or the organization-specific content sub-category of each piece of training data.

7. The method according to claim 1, wherein, if step a) was performed and input was passed to the destined Gen AI application, the method further comprises governing use of Gen AI application generated content by:

receiving Gen AI generated content from the Gen AI application in response to the input passed to the Gen AI application, temporarily storing the Gen AI generated content in a proxy, applying a policy screening on the Gen AI generated content according to the Gen AI use policy applied on the use case, wherein the policy screening comprises;

categorizing the Gen AI generated content into one of 'allow', 'ask' and 'block' categories based on a plurality of screening policies determined for different types of Gen AI generated content, wherein the content category of the Gen AI generated content determined by the content categorizer trained to recognize at least one of text with legal content, text with financial content, text with medical content, text with political content, computer program code and organization-specific content, and performing at least one policy enforcement action depending on the categorization of the Gen AI generated content, wherein the at least one policy enforcement action is selected among:

d) 'allow' policy enforcement action causing passing the Gen AI generated content from the proxy as result to the user interface, selected in response to categorizing the Gen AI generated content into 'allow' category by all applied screening policies of the use case, e) 'block' policy enforcement action, selected in response to determining that the Gen AI generated content is determined to be in the 'block' category in the use case, the 'block' policy enforcement action causing the policy screening to disable the Gen AI generated content from being passed from the proxy to the user interface, and causing the user interface to display the user with a reason for blocking the Gen AI generated content, wherein the displayed reason refers to a respective screening policy that caused the Gen AI generated content to be categorized into the 'block' category, f) 'ask' policy enforcement action, selected in response to determining that the Gen AI generated content does not belong in the 'block' category, but the Gen AI generated content is determined to be the 'ask' category for the use case, the 'ask' policy enforcement action causing the user interface to request the user to enter a decision whether to continue with passing the Gen AI generated content from the proxy by:

providing in the user with interface information or a link to information that determines a respective screening policy causing the Gen AI generated content to be categorized into the 'ask' category, providing in the user interface a prompt to the user for submitting a screening policy prompted input comprising a rationale why the Gen AI generated content should be categorized into the 'allow' category, upon receiving, via the user interface, the screening policy prompted input comprising the rationale, storing the screening policy prompted input in a log, receiving, from the user via the user interface, any one of an indication to continue with the Gen AI application interaction and an indication to cancel the Gen AI application interaction, and in dependence of the indication received from the user via the user interface, performing the respective policy enforcement action d) or e).

8. The method according to claim 7, wherein the method further comprises:

categorizing the Gen AI generated content into one of 'allow', 'ask' and 'block' categories based on an anti-drift policy, which causes the Gen AI generated content to be categorized into the respective category based on:

one or more data types, wherein the one or more data types comprises at least one of: image or video or computer program code, and one or more content categories, wherein the content category of Gen AI generated content comprises two or more of: computer program code, text with legal content, or text with financial content, or text with political content, or text with medical content.

9. The method according to claim 8, wherein the content category of the Gen AI generated content is determined by means of artificial intelligence trained with general use training data representing predetermined content categories and/or organization-specific labelled training data representing one or more organization-specific content categories and/or one or more organization-specific content sub-categories.

10. The method according to claim 9, wherein training data for training artificial intelligence used for determining one or more organization-specific content categories and/or organization-specific content sub-categories comprises previously categorized input and/or Gen AI generated content, wherein each previously categorized input and/or Gen AI generated content included in the training data is organization-specific labelled training data, wherein the organization-specific labelling indicates the organization-specific content category or the organization-specific content sub-category of each piece of training data.

11. The method according to claim 10, further comprising updating a word vector database based on said organization-specific labelled training data, wherein the word vector database is used by artificial intelligence for determining one or more organization-specific content categories and/or organization-specific content sub-categories.

12. The method according to claim 11, wherein the training data is discarded after completing updating of the word vector database.

13. The method according to claim 1, wherein the method further comprises:

modifying result by embedding a unique identifier therein, and storing the result in a log with the unique identifier.

14. The method according to claim 13, wherein the unique identifier is embedded into the result as one of: a text addition, a file metadata addition, an embedded watermark or non-removable technical encoding.

15. The method according claim 1, wherein the method comprises logging of each governed Gen AI interaction, wherein the logging comprises:

storing log data of the Gen AI interaction event, wherein the log data comprises:

interaction payload information comprising a unique reference assigned to the Gen AI interaction, input prompt submitted by the user, input payload submitted by the user, if submitted by the user, and Gen AI generated content, if received in response to the input, and policy event information comprising at least one time stamp for the Gen AI interaction, screening policy or policies applied to the Gen AI interaction, performed policy enforcement action, screening policy prompted input, if any, and optional success and/or failure codes concerning the policy event.

16. A device for governing a generative artificial intelligence (Gen AI) interaction to prevent unauthorized disclosure of data, the device comprising a non-transitory computer readable storage medium having computer executable instructions stored thereon, and a processor, the computer executable instructions, which when executed by the processor, cause the device to perform a method comprising:

receiving input destined to a Gen AI application via a user interface, temporarily storing the input in a proxy, determining a use case based on a user group of a user from which the input is received and the Gen AI application the input is destined to, and selecting a Gen AI use policy to be applied based on the use case, wherein the applied Gen AI use policy defines a plurality of screening policies determined for a content category comprised in the input and one or more of a data type, a data rate, personally identifiable information, and a custom keyword list, wherein the content category is determined by a content categorizer trained to recognize at least one of text with legal content, text with financial content, text with medical content, text with political content, computer program code and organization-specific content, applying a policy screening on the input, wherein the policy screening comprises categorizing the input into one of 'allow', 'ask' and 'block' categories according to the Gen AI use policy applied on the use case, and performing at least one policy enforcement action depending on the categorization of the input, wherein the at least one policy enforcement action is selected among:

d) an 'allow' policy enforcement action causing passing the input from the proxy to the Gen AI application, selected in response to categorizing the input into 'allow' category by all of the plurality of applied screening policies, e) a 'block' policy enforcement action, selected in response to determining that the input and/or at least one piece of data comprised in the input is determined to be in the 'block' category in the use case, the 'block' policy enforcement action causing the policy screening to stop processing of the input, not submitting the input to the Gen AI application, and the user interface displaying the user a reason for blocking the input, wherein the displayed reason refers to a respective screening policy that caused the input to be categorized into the 'block' category, f) an 'ask' policy enforcement action, selected in response to determining that neither the input nor any piece of data comprised in the input is determined to belong in the 'block' category, and the input or at least one piece of data comprised in the input is determined to be the 'ask' category for the use case, the 'ask' policy enforcement action causing the user interface to request the user to enter a decision on whether to continue with passing the input from the proxy to the destined Gen AI application or not by:

providing in the user interface information or a link to information that describes a respective screening policy causing the input or at least one piece of data comprised in the input to cause the input to be categorized into the 'ask' category, providing in the user interface a prompt to submit a screening policy prompted input comprising a rationale, upon receiving, via the user interface, the screening policy prompted input, logging the screening policy prompted input, receiving, from the user via the user interface, any one of an indication to continue with the Gen AI application interaction and an indication to cancel the Gen AI application interaction, and in dependence of the indication received from the user via the user interface, performing the respective policy enforcement action a) or b).

17. A device for governing a generative artificial intelligence (Gen AI) interaction to prevent unauthorized disclosure of data, the device comprising a memory that includes computer executable code that performs, which when executed with one or more processors of the device, causes the device to:

receive input destined to a Gen AI application via a user interface, temporarily store the input in a proxy, determine a use case based on a user group of a user from which the input is received and the Gen AI application the input is destined to, and selecting a Gen AI use policy to be applied based on the use case, wherein the applied Gen AI use policy defines a plurality of screening policies determined for a content category comprised in the input and one or more of a data type, a data rate, personally identifiable information, and a custom keyword list, wherein the content category is determined by a content categorizer trained to recognize at least one of text with legal content, text with financial content, text with medical content, text with political content, computer program code and organization-specific content, apply a policy screening on the input, wherein the policy screening comprises categorizing the input into one of 'allow', 'ask' and 'block' categories according to the Gen AI use policy applied on the use case, and performing at least one policy enforcement action depending on the categorization of the input, wherein the at least one policy enforcement action is selected among:

g) an 'allow' policy enforcement action causing passing the input from the proxy to the Gen AI application, selected in response categorizing the input into 'allow' category by all of the plurality of applied screening policies, h) a 'block' policy enforcement action, selected in response to determining that neither the input nor any piece of data comprised in the input is determined to belong in the 'block' category, but the input or at least one piece of data comprised in the input is determined to be the 'ask' category for the use case, the 'ask' policy enforcement action causing the policy screening to stop processing of the input, not submitting the input to the Gen AI application, and the user interface displaying the user a reason for blocking the input, wherein the displayed reason refers to a respective screening policy that caused the input to be categorized into the 'block' category, i) an 'ask' policy enforcement action, selected in response to determining that neither the input nor any piece of data comprised in the input is determined to belong in the 'block' category, and the input or at least one piece of data comprised in the input is determined to be the 'ask' category for the use case, the 'ask' policy enforcement action causing the user interface to request the user to enter a decision on whether to continue with passing the input from the proxy to the destined Gen AI application or not by:

providing in the user interface information or a link to information that describes a respective screening policy causing the input or at least one piece of data comprised in the input to cause the input to be categorized into the 'ask' category, providing in the user interface a prompt to submit a screening policy prompted input comprising a rationale, upon receiving, via the user interface, the screening policy prompted input, logging the screening policy prompted input, receiving, from the user via the user interface, any one of an indication to continue with the Gen AI application interaction and an indication to cancel the Gen AI application interaction, and in dependence of the indication received from the user via the user interface, performing the respective policy enforcement action a) or b).

\* \* \* \* \*